United States Patent
Kobayashi et al.

(10) Patent No.: US 11,074,010 B2
(45) Date of Patent: Jul. 27, 2021

(54) STORAGE SYSTEM AND CONTROL METHOD THEREOF

(71) Applicant: HITACHI, LTD., Tokyo (JP)

(72) Inventors: Yutaro Kobayashi, Tokyo (JP); Shinichi Kasahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/297,007

(22) Filed: Mar. 8, 2019

(65) Prior Publication Data

US 2020/0004463 A1   Jan. 2, 2020

(30) Foreign Application Priority Data

May 25, 2018 (JP) .............................. JP2018-101066

(51) Int. Cl.
*G06F 3/06* (2006.01)

(52) U.S. Cl.
CPC ............ *G06F 3/0659* (2013.01); *G06F 3/065* (2013.01); *G06F 3/0617* (2013.01); *G06F 3/0644* (2013.01); *G06F 3/0646* (2013.01); *G06F 3/0683* (2013.01)

(58) Field of Classification Search
CPC .... G06F 3/0617; G06F 3/0644; G06F 3/0646; G06F 3/065; G06F 3/0659; G06F 3/0683
See application file for complete search history.

(56) References Cited

U.S. PATENT DOCUMENTS

| | | | | |
|---|---|---|---|---|
| 2008/0301311 | A1* | 12/2008 | Bestler | H04L 69/16 709/230 |
| 2011/0185122 | A1* | 7/2011 | Choi | G06F 11/1076 711/114 |
| 2014/0040497 | A1* | 2/2014 | Dave | H04L 12/5895 709/231 |
| 2016/0283134 | A1* | 9/2016 | Samanta | G06F 3/0617 |
| 2017/0131932 | A1* | 5/2017 | Fu | G06F 1/3243 |
| 2018/0246737 | A1* | 8/2018 | Boeck | G06F 8/63 |

(Continued)

FOREIGN PATENT DOCUMENTS

WO   2017149674 A1   9/2017

OTHER PUBLICATIONS

DI-MMAP—a scalable memory-map runtime for out-of-core data-intensive applications by Essen (Year: 2015).*

(Continued)

*Primary Examiner* — Paul M Knight
(74) *Attorney, Agent, or Firm* — Volpe Koenig

(57) ABSTRACT

A processor of a storage controller stores a parameter according to a command that has been transferred from a front-end unit to a first area in a first memory area and issues notification to the front-end unit regarding an address of a second area in a second memory area which is mapped to the first area, the front-end unit generates a data packet whose destination is the notified address and stores the generated data packet at the address of the second memory area, and an interface unit reads the parameter stored in the first area in the first memory area which is mapped to the second area of the address based on the destination address stored in a header of the data packet which has been stored in the second memory area and executes processing of the system function according to the command.

6 Claims, 20 Drawing Sheets

(56) References Cited

U.S. PATENT DOCUMENTS

2018/0341429 A1* 11/2018 Bolkhovitin .......... G06F 3/0659
2018/0349031 A1    12/2018 Ide et al.

OTHER PUBLICATIONS

NUMA (Non-Uniform Memory Access): An Overview by Lameter (Year: 2013).*
Merriam Webster Definition of Thus (Year: 2020).*
ElastiCon: An Elastic Distributed SDN Controller by Dixit (Year: 2014).*

* cited by examiner

FIG.4

OWNER/PAIR MAPPING TABLE 32

| OWNER | PAIR |
|---|---|
| CTL1 | CTL3 |
| CTL2 | CTL4 |
| CTL3 | CTL1 |
| CTL4 | CTL2 |

32A     32B

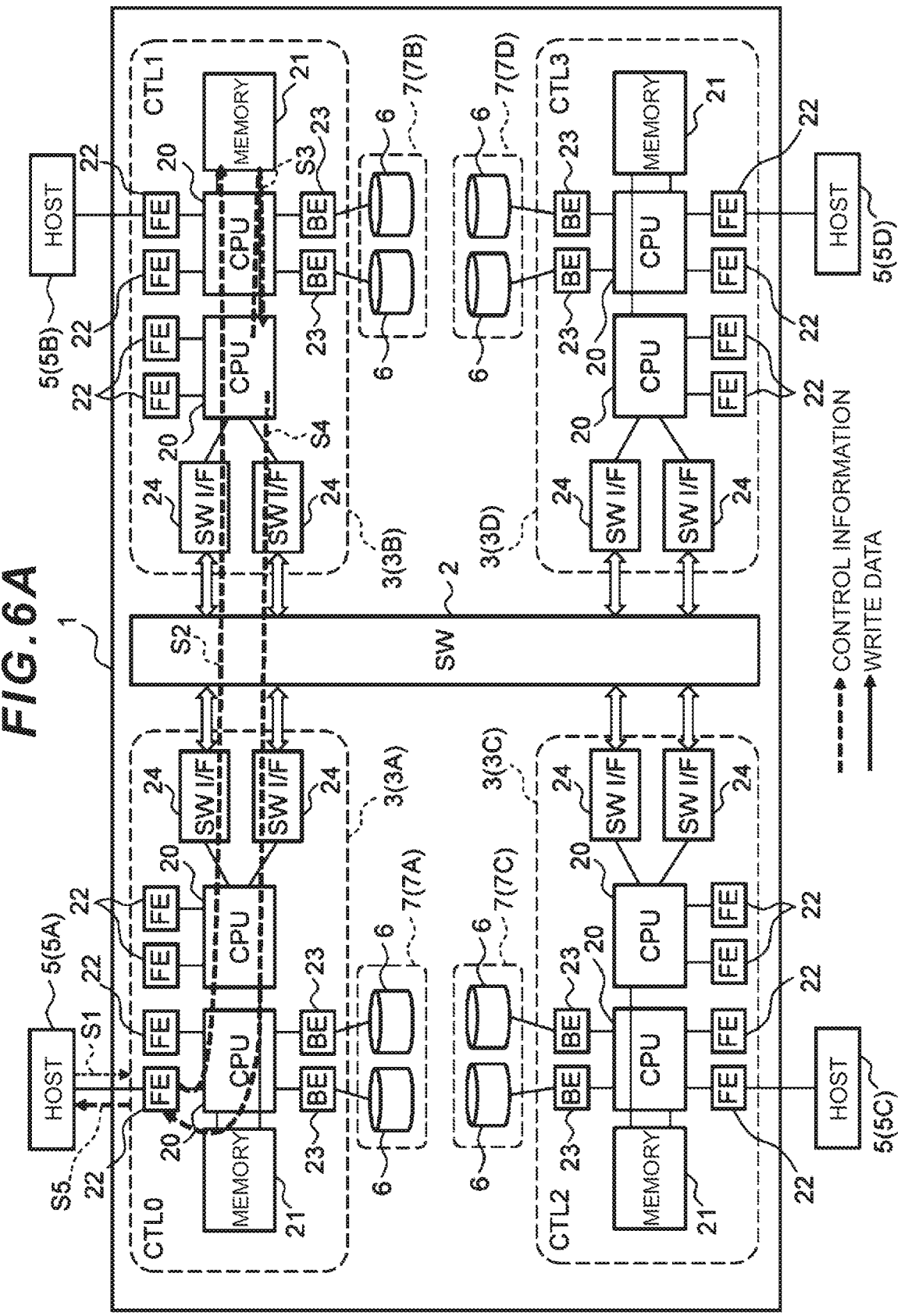

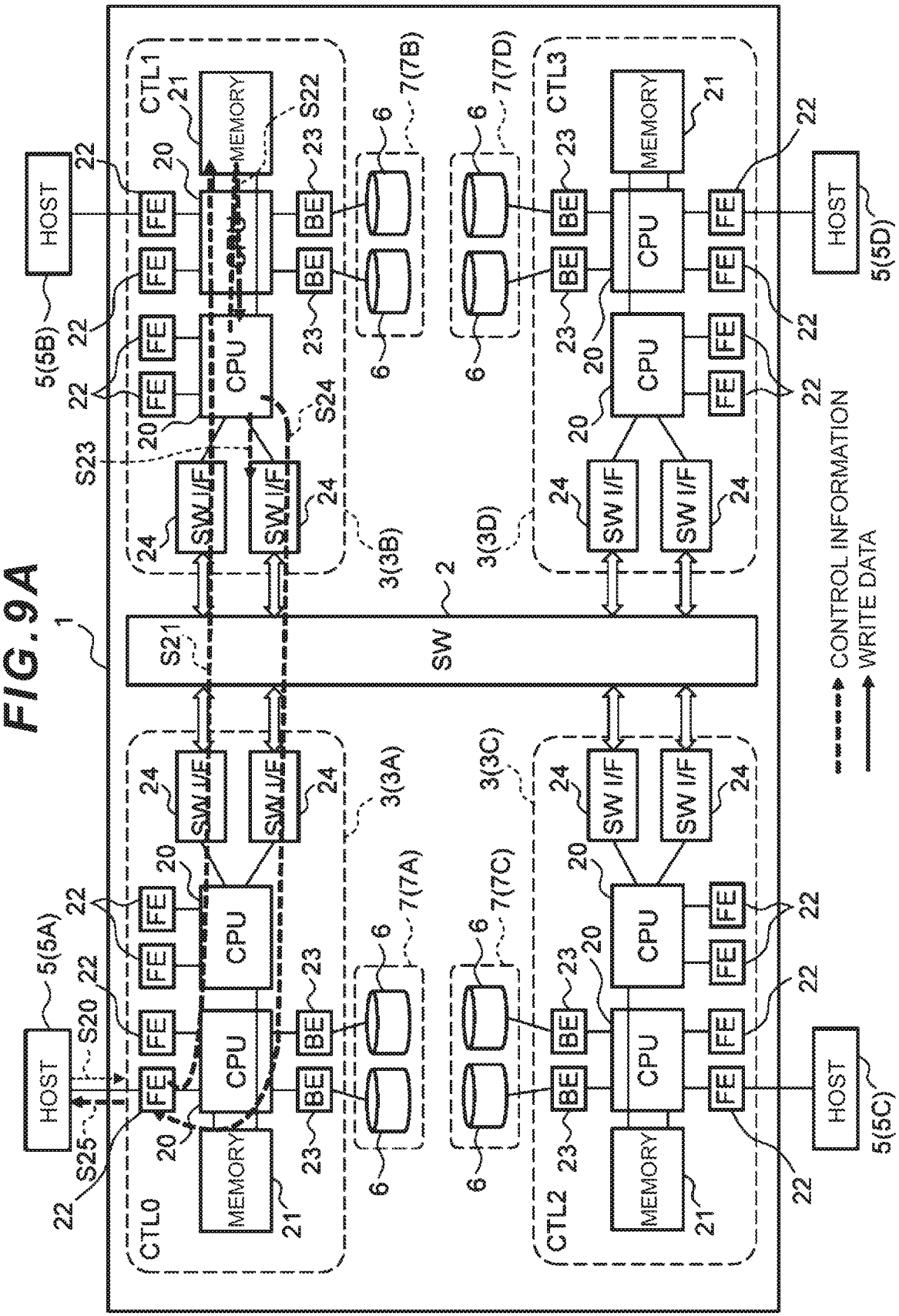

FIG. 10A

SW I/F PARAMETER FORMAT

| | +0<br>76543210 | +1<br>76543210 | +2<br>76543210 | +3<br>76543210 |
|---|---|---|---|---|
| Byte0 | FUNCTION NUMBER | | FUNCTION AUXILIARY NUMBER | TARGET CTL NUMBER |
| Byte4<br>Byte8 | SYSTEM FUNCTION USAGE ADDRESS<br>(ADDRESS IN TARGET CTL NUMBER) | | | |
| Byte12<br>Byte16 | SYSTEM FUNCTION-SPECIFIC USAGE AREA<br>(WRITE DESTINATION<br>ADDRESS OF OWN CTL IN CASE OF DOUBLE WRITE) | | | |
| Byte20 | LRC(Byte0~Byte19⊕XOR) | | | |

FIG. 10B

SYSTEM FUNCTION ALLOCATION DETAILS

| FUNCTION NUMBER | SYSTEM FUNCTION |
|---|---|
| 0x0000 | SINGLE WRITE |
| 0x0001 | DOUBLE WRITE |
| 0x0002 | CRC CHECK |
| 0x0003 | OTHER CTL READ (DATA) |
| 0x0004 | CONTROL INFORMATION TRANSMISSION |
| ... | ... |

FIG. 10C

FUNCTION AUXILIARY NUMBER ALLOCATION DETAILS

| FUNCTION AUXILIARY NUMBER | DETAILS |
|---|---|
| 0x00 | T10DIF Check |
| 0x01 | T10DIF Insert |
| ... | ... |

FIG. 10D

SW I/F PARAMETER EXAMPLE (DOUBLE WRITE)

| | +0<br>76543210 | +1<br>76543210 | +2<br>76543210 | +3<br>76543210 |
|---|---|---|---|---|
| Byte0 | DOUBLE WRITE(0x0001) | | Check(0x00) | CTL2(0x01) |
| Byte4<br>Byte8 | WRITE DESTINATION ADDRESS 1 OF CTL2<br>WRITE DESTINATION ADDRESS 2 OF CTL2 | | | |
| Byte12<br>Byte16 | WRITE DESTINATION ADDRESS 1 OF OWN CTL<br>WRITE DESTINATION ADDRESS 2 OF OWN CTL | | | |
| Byte20 | LRC(Byte0~Byte19⊕XOR) | | | |

SEQUENCE

FLOW OF PROCESSING IN SW I/F

SEQUENCE

FLOW OF PROCESSING IN SW I/F

SEQUENCE

FLOW OF PROCESSING IN SW I/F

SEQUENCE

FLOW OF PROCESSING IN SW I/F

STORAGE SYSTEM AND CONTROL METHOD THEREOF

TECHNICAL FIELD

The present invention relates to a storage system and a control method thereof and is preferably applied to a storage system comprising a plurality of storage controllers.

BACKGROUND ART

Conventionally, technology according to which one cluster is configured from a plurality of storage apparatuses and, by processing data and commands and the like that have been supplied from a high order apparatus (hereinafter called a host) by transferring same between storage apparatuses in the cluster to a corresponding storage apparatus, the host is made to view the cluster as one large storage apparatus, is widely used (see PTL 1).

Furthermore, in this cluster, the automatic duplication of write data from the host is also widely practiced. For example, PTL 1 discloses technology according to which, in such a storage system, when data received by a first storage apparatus is transferred via a second storage apparatus to a third storage apparatus, data is also left in the second storage apparatus, and data can be quickly stored redundantly in the second and third storage apparatuses.

CITATION LIST

Patent Literature

[PTL 1] International Laid-open Publication No. 2017/149674

SUMMARY OF THE INVENTION

Problems to be Solved by the Invention

However, in the storage system disclosed in PTL 1, write target user data (hereinafter called write data) which has been supplied from the host is stored temporarily to memory in the first storage apparatus, and since this data has a configuration for reading by the second storage apparatus, it is hard to rapidly perform a data transfer from the first storage apparatus to the second storage apparatus and, as a result, there has been a problem in that it is hard to improve the response performance of the whole storage system from the perspective of the host.

The present invention was devised in view of the foregoing points and an object thereof is to propose a storage system and control method thereof which enable an improvement in response performance from the perspective of a host.

Means to Solve the Problems

In order to solve this problem, the present invention is a storage system having a plurality of storage controllers which are bidirectionally communicably coupled, the storage controllers each comprising a front-end unit which performs protocol control during communications with a host, an interface unit which functions as an interface during communications with the other storage controller in the system, a processor which processes a command from the host, and first and second memory areas which are each provided inside or outside the interface unit, wherein the first memory area is managed subdivided into a plurality of first areas, and the second memory area is managed subdivided into a plurality of second areas which are each mapped to each of the first areas, wherein the front-end unit transfers the command from the host to the corresponding storage controller, wherein the processor stores a parameter, which is required to realize a system function according to the command that has been transferred from the front-end unit to its own storage controller, in the first area in the first memory area and issues notification to the front-end unit regarding the address of the second area which is mapped to the first area, among the second areas in the second memory area, wherein the front-end unit generates a data packet in whose header the notified address is stored as a destination and stores the generated data packet at the address of the second memory area, and the interface unit reads the parameter stored in the first area in the first memory area which is mapped to the second area of the address based on the destination address stored in the header of the data packet which has been stored in the second memory area and executes processing of the system function according to the command based on the parameter thus read.

In a control method of a storage system comprising a plurality of storage controllers which are bidirectionally communicably coupled, the storage controllers each comprising a front-end unit which performs protocol control during communications with a host, an interface unit which functions as an interface during communications with the other storage controller in the system; a processor which processes a command from the host; and first and second memory areas which are each provided inside or outside the interface unit, wherein the first memory area is managed subdivided into a plurality of first areas, and the second memory area is managed subdivided into a plurality of second areas which are each mapped to each of the first areas, the control method comprising a first step in which the front-end unit transfers the command from the host to the corresponding storage controller, a second step in which the processor stores a parameter, which is required to realize a system function according to the command that has been transferred from the front-end unit to its own storage controller, in the first area in the first memory area and issues notification to the front-end unit regarding the address of the second area which is mapped to the first area, among the second areas in the second memory area, a third step in which the front-end unit generates a data packet in whose header the notified address is stored as a destination and stores the generated data packet at the address of the second memory area, and a fourth step in which the interface unit reads the parameter stored in the first area in the first memory area which is mapped to the second area of the address based on the address of the destination stored in the header of the data packet which has been stored in the second memory area and executes processing of the system function according to the command based on the parameter thus read.

According to the storage system and storage system control method of the present invention, required information is transferred from a storage controller which has received a command from a host to a storage controller which is to execute the command, without using an intermediate buffer as an intermediary.

Advantageous Effects of the Invention

According to the present invention, a storage system and control method thereof which enable an improvement in response performance from the perspective of the host can be realized.

BRIEF DESCRIPTION OF DRAWINGS

FIG. 4 is a table showing a configuration example of an owner/pair mapping table.

FIG. 6A is a block diagram serving to explain the flow of write processing in a conventional storage system.

FIG. 9A is a block diagram serving to explain the flow of write processing in a storage system according to the embodiment.

FIGS. 10A to 10C are tables serving to explain a switch interface parameter, and FIG. 10D is a table showing a configuration example of a switch interface parameter relating to a double write.

DESCRIPTION OF EMBODIMENTS

An embodiment of the present invention will be explained in detail hereinbelow with reference to the appended drawings.

(1) Configuration of the Storage System According to the Embodiment

Figure 1:
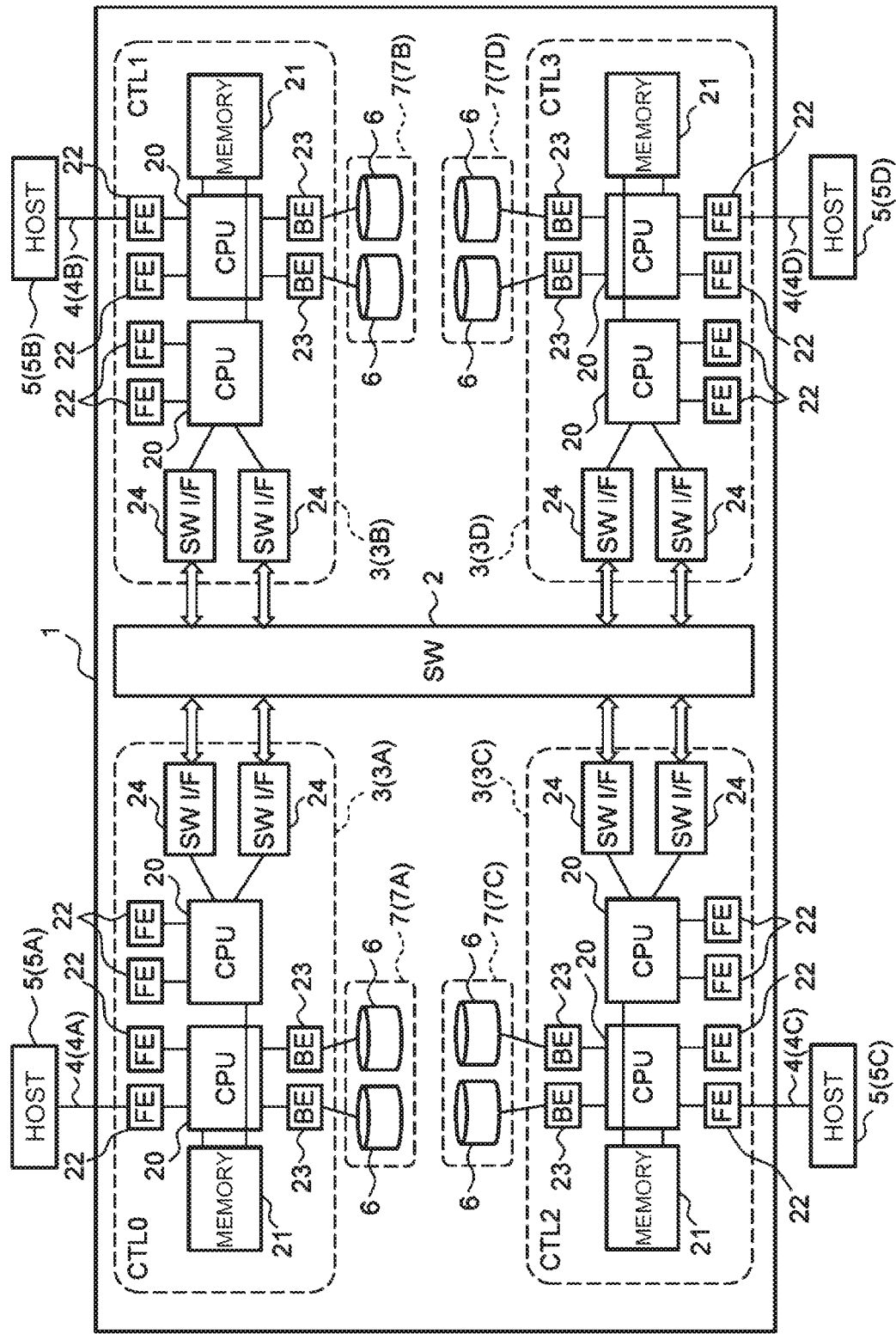
FIG. 1 is a block diagram showing an overall configuration of a storage system according to the embodiment.

In FIG. 1, 1 denotes the whole storage system according to this embodiment. This storage system 1 is configured by comprising a plurality of storage controllers 3A to 3D which are bidirectionally communicably coupled via a PCIe (Peripheral Component Interconnect express) switch 2, for example. FIG. 1 shows an example in which a cluster (storage system 1) is configured from four storage controllers 3A to 3D but the number of storage controllers from which the cluster (storage system 1) is configured is not limited to four. In the ensuing explanation, it is assumed that when no distinction is made between the storage controllers 3A to 3D, same will be referred to as the storage controller 3.

The storage controllers 3 are each bidirectionally communicably coupled to hosts 5A to 5D via communication networks 4A to 4D respectively. Note that at least a portion of the communication networks 4A to 4D may be common or the communication networks 4A to 4D are all the same communication network. Likewise, at least a portion of the hosts 5A to 5D may be common or the hosts 5A to 5D may all be the same host. In the ensuing explanation it is assumed that when no particular distinction between the communication networks 4A to 4D is made, same are collectively referred to as the communication network 4, and when no particular distinction between the hosts 5A to 5D is made, same are collectively referred to as the host 5.

The host 5 is a computer apparatus which sends read commands and write commands to a storage controller 3 via the communication network 4 based on user-operated or installed application software and is configured from a mainframe or open-type server or the like. When the host 5 is a mainframe, communication between the host 5 and storage controller 3 is performed according to a communications protocol such as, for example, FICON (Fibre Connection: registered trademark), ESCON (Enterprise System Connection: registered trademark), ACONARC (Advanced Connection Architecture: registered trademark), or FIBARC (Fibre Connection Architecture: registered trademark). Furthermore, when the host 5 is an open-type server, communication between the host 5 and storage controller 3 is performed according to a communications protocol such as, for example, FC (Fibre Channel), TCP/IP (Transmission Control Protocol/Internet Protocol), or iSCSI (Internet Small Computer System Interface).

Memory apparatuses 7A to 7D, which are each configured from one or more memory devices 6, are coupled to each of the storage controllers 3A to 3D. In the ensuing explanation, when no particular distinction between the memory apparatuses 7A to 7D is made, same are collectively referred to as the memory apparatus 7. Note that although FIG. 1 illustrates a case where individual memory apparatuses 7A to 7D are each coupled to individual storage controllers 3A to 3D, a configuration in which some or all of the storage controllers 3A to 3D are coupled to the same memory apparatuses 7A to 7D is also possible. One storage apparatus is constructed by means of one storage controller 3 and one memory apparatus 7.

The memory device 6 is, for example, configured from a hard disk device, semiconductor memory device, optical disk device or magneto-optical disk device or the like. When a hard disk device is used as the memory device 6, it is possible to use an FC (Fibre Channel) disk, SCSI (Small Computer System Interface) disk, SATA disk, ATA (AT Attachment) disk, or SAS (Serial Attached SCSI) disk or the like. Furthermore, a variety of memory devices 6 such as, for example, flash memory (SSD), MRAM (Magnetoresistive Random Access Memory), Phase-Change Memory, ReRAM (Resistive Random-Access Memory), and FeRAM (Ferroelectric Random-Access Memory) can also be used. In addition, a configuration in which memory devices of different types are mixed in the memory apparatus 7, for example, is possible.

Figure 2:
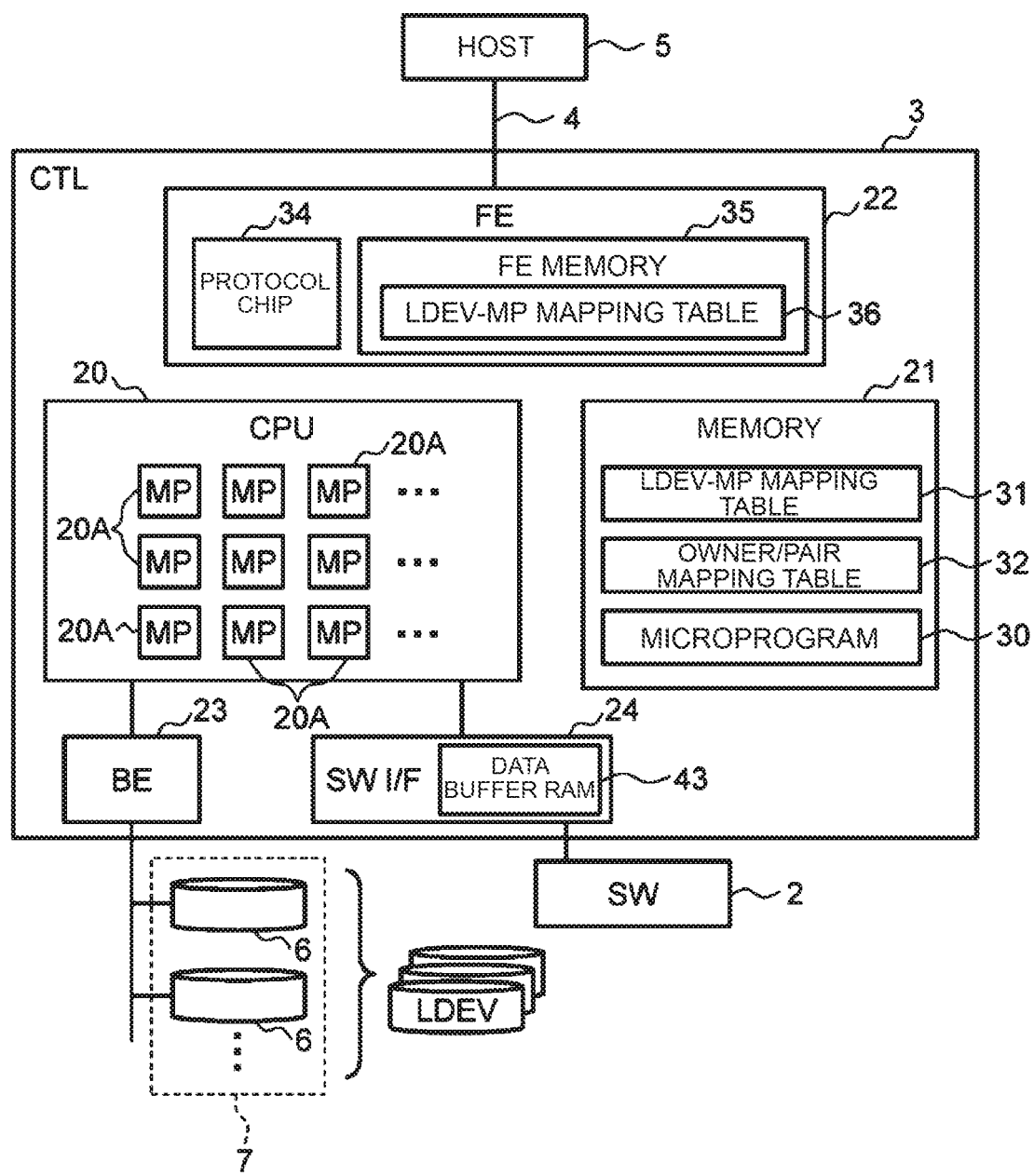
FIG. 2 is a block diagram showing a detailed configuration of a storage controller.

A memory area in which one or more memory devices 6 are provided is managed as a pool, one or more logical volumes (hereinafter called logical volumes) are defined in the pool, and the logical volumes are provided to the host 5 as memory areas for reading and writing data. Note that the logical volumes are displayed as LDEV (Logical DEVice) in the drawings as shown in FIG. 2, for example. The memory areas in the logical volume are managed subdivided into small areas of a predetermined size known as logical blocks and a unique address called an LBA (Logical Block Address) is assigned to each of these logical blocks. Furthermore, when reading/writing data to/from a logical volume, the host sends a read command or write command which designates an identifier of this logical volume (LUN: Logical Unit Number), the LBA of the first logical block in the area to/from which data in the logical volume is read/written, and a data length of the data to be read/written, to the storage controller 3.

Storage controllers 3 are each configured by comprising one or more of a CPU 20, memory 21, front-end 22, back-end 23 and switch interface 24.

The CPU 20 is a processor which is tasked with controlling the overall operation of the storage controller 3. Furthermore, the memory 21 is, for example, configured from a semiconductor memory such as a DIMM (Dual Inline Memory Module) or a hard disk apparatus or both, and is used to hold various programs and data.

The front-end 22 is an interface apparatus which performs protocol conversion during communications with the host 5 via the communication network 4. The front-end 22 sends and receives commands and data to/from the host 5 based on control of the CPU 20.

The back-end 23 is an interface apparatus for inputting and outputting data to/from the memory apparatus 7. The CPU 20 reads/writes data to/from the memory device 6 which provides the memory area of the designated logical volume via the back-end 23 according to a request from the host 5.

The switch interface 24 is an apparatus for bidirectionally communicating with the other storage controllers 3 via the PCIe switch 2. Details of this switch interface 24 will be described subsequently. The switch interface 24 is coupled to the switch interfaces 24 in the other storage controllers 3 via the PCIe switch 2.

FIG. 2 shows a detailed configuration of the storage controller 3. The CPU 20 comprises a plurality of microprocessors 20A. Microprocessor 20A is sometimes abbreviated to MP 20A hereinbelow. The CPU 20 allocates command processing and so forth to any MP 20A among the built-in MP 20A. The CPU 20 is capable of parallel-processing a plurality of commands. The processing that the CPU 20 is tasked with is actually executed by any MP 20A, and hence, strictly speaking, a distinction between the CPU 20 and MP 20A is not necessary.

The memory area of memory 21 is managed subdivided into, for example, a working area provided by the CPU 20, a cache area which holds received data from the host 5 or other storage controller 3, a management information area which stores tables that are used by each MP 20A, and a program area which holds a computer program that is executed by each MP 20A. However, a configuration in which the memory 21 is prepared for each area is also possible.

The program area stores a microprogram 30 in addition to an operating system and driver software and the like which are not illustrated, for example. Each MP 20A executes various processing as described subsequently based on this microprogram 30. The management information area stores an LDEV-MP mapping table 31 and an owner/pair mapping table 32 which will be described subsequently, for example.

Provided in the front-end 22 is a protocol chip 34 which performs protocol control during communications with the host 5. The protocol chip 34 of the embodiment comprises a DMA function for writing data and commands directly to the switch interface 24 as will be described subsequently. Furthermore, an FE memory 35 is also provided in the front-end 22. The FE memory 35 is used to hold required control information in addition to being used to temporarily store write data from the host 5 and read data that has been read from the memory apparatus 7. The LDEV-MP mapping table 36 described subsequently is stored and managed in the FE memory 35. Note that the FE memory 35 may also be built into the protocol chip 34.

The switch interface 24 comprises a data buffer RAM (Random Access Memory) 43 as a memory area which temporarily stores user data. Details of this switch interface 24 will be described subsequently.

Figure 3:
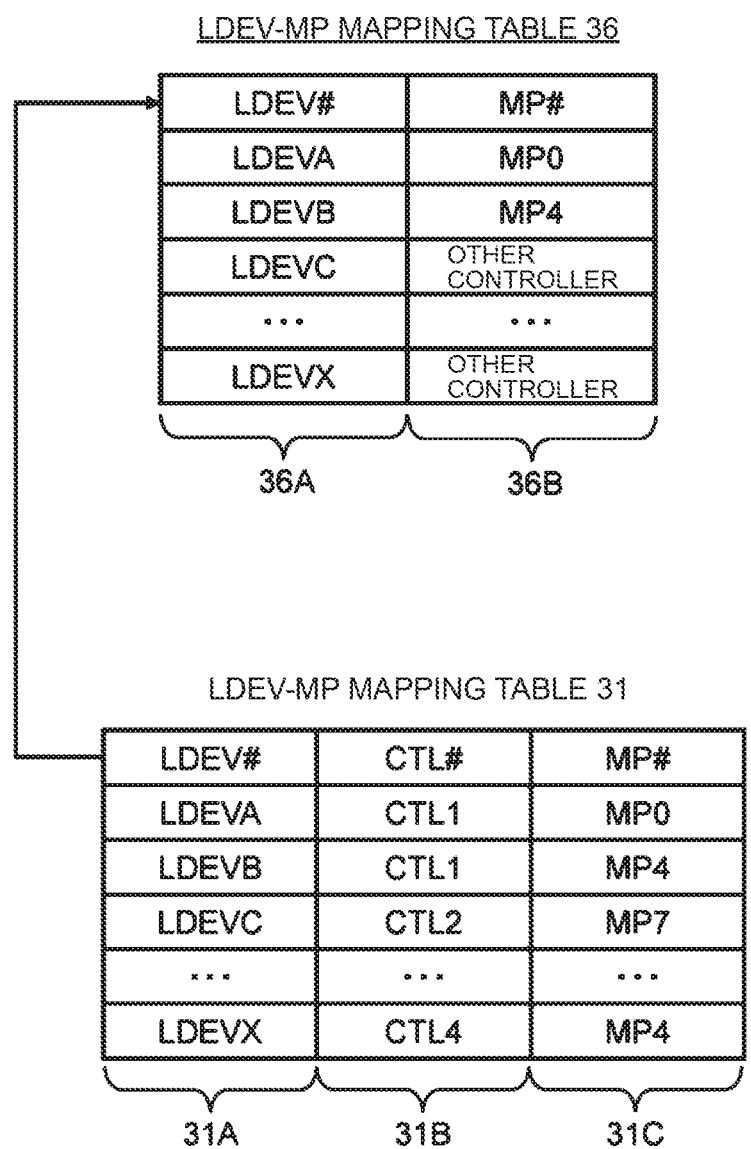
FIG. 3 is a table showing a configuration example of an LDEV-MP mapping table.

FIG. 3 shows a configuration example of the LDEV-MP mapping table 36 (FIG. 2) stored in the FE memory 35 (FIG. 2) of the front-end 22 and the LDEV-MP mapping table 31 (FIG. 2) stored in the memory 21.

The LDEV-MP mapping table 31 is a table which is used to manage all the logical volumes that have been created in the cluster (storage system 1). The LDEV-MP mapping table 31 is configured by comprising a volume number (LDEV#) field 31A, a controller number (CTL#) field 31B and an MP number (MP#) field 31C. In the LDEV-MP mapping table 31, one row corresponds to one logical volume that has been created in the cluster.

Furthermore, the volume number field 31A stores an identification number (volume number) which is unique to the logical volume and which has been assigned to each logical volume created in the cluster. Furthermore, the controller number field 31B stores an identification number (storage number) of the storage controller 3 which manages the corresponding logical volume.

Moreover, the MP number field 31C stores an identification number (MP number) which is unique to the MP 20A (FIG. 2) in the duster and which has been assigned to the MP 20A responsible for the corresponding logical volume. Note that 'the MP responsible for the logical volume' denotes the MP 20A which reads/writes the requested data from/to the logical volume according to a read command or write command targeting the logical volume when the read command or write command is supplied from the host 5.

Accordingly, in the case of the example in FIG. 3, it can be seen that the logical volume with the volume number 'LDEV-A' is managed by the MP 20A which has been assigned the MP number 'MP#0' in the storage controller 3 which has been assigned the controller number 'CTL1.'

Further, the LDEV-MP mapping table 36 is a table which is used to manage mapping relationships between logical volumes and the MP 20A in the storage controller 3 where the front-end 22 holding the LDEV-MP mapping table 36 is provided and which is created by extracting only the required information from the LDEV-MP mapping table 31.

This LDEV-MP mapping table 36 is configured by comprising a volume number (LDEV#) field 36A and an MP number (MP#) field 36B. Further, the volume number field 36A stores the volume numbers of each of the logical volumes created in the cluster (storage system 1). Furthermore, the MP number field 36B stores the MP numbers of the MP 20A responsible for the corresponding logical volumes.

The logical volumes under the management of the other storage controllers 3 are beyond the jurisdiction of this LDEV-MP mapping table 36. However, the 'other controller' value has been configured, in the corresponding MP number field 36B in the LDEV-MP mapping table 36, for logical volumes beyond its jurisdiction so that the fact that these are logical volumes which are under the management of another storage controller 3 can be recognized.

Therefore, in the case of the example in FIG. 3, it can be seen that the logical volumes with the volume numbers 'LDEV-A' and 'LDEV-B' are managed by the storage controller 3 where the front-end 22 holding the LDEV-MP mapping table 36 is installed, and these logical volumes are managed by MP 20A with the MP numbers 'MP#0' and 'MP#4' respectively, whereas the logical volumes with the volume numbers 'LDEV-C' and 'LDEV-X' are managed by MP 20A in other storage controllers 3.

Note that when the front-end 22 has received a command targeting a logical volume beyond its jurisdiction, the MP 20A transfers the command to the storage controller 3 which is managing that logical volume.

FIG. 4 shows a configuration example of the owner/pair mapping table 32 which is stored and managed in the memory 21. The owner/pair mapping table 32 is a table which is used to manage mapping relationships between owners and pairs which form a copy pair and in which one row corresponds to one copy pair.

Here, 'owner' denotes a storage controller 3 which manages the logical volume which is targeted for command processing. That is, the 'owner' is the storage controller 3 which processes commands. Furthermore, 'pair' denotes a storage controller 3 which forms the copy pair with the owner storage controller 3 for the data targeted for command processing. In the ensuing explanation, on occasion the storage controller 3 serving as the owner will be called the owner controller 3, the storage controller 3 forming the pair with the owner controller 3 will be called the pair controller 3, and the storage controller 3 which has received the command from the host 5 will be called the receiving controller 3.

This owner/pair mapping table 32 is configured by comprising an owner field 32A and a pair field 32B as shown in FIG. 4. Furthermore, the owner field 32A stores identification numbers (hereinafter called controller numbers) of storage controllers which manage any logical volume (logical volume owner controllers) 3, and the pair field 32B stores controller numbers of storage controllers 3 which form a copy pair with the corresponding owner controller 3.

Accordingly, in the case of the example in FIG. 4, it can be seen, for example, that the storage controller 3 with the controller number 'CTL1' has been configured for a copy pair with the storage controller 3 with the controller number 'CTL3.' The combination that has been registered in the owner/pair mapping table 32 is not fixed and can be modified dynamically according to the status of the storage system 1.

Figure 5:
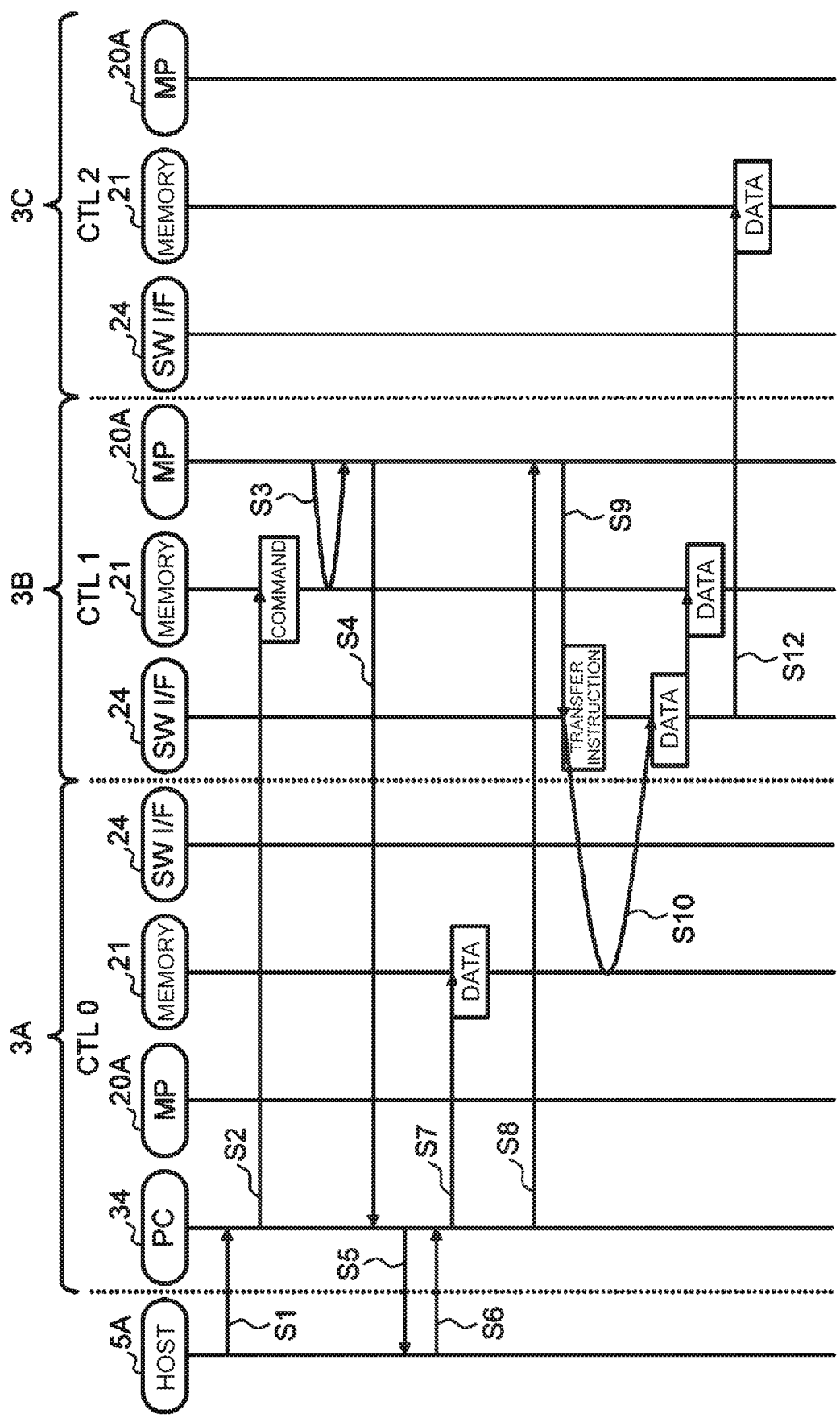
FIG. 5 is a sequence diagram serving to explain the flow of write processing in a conventional storage system.
Figure 6B:
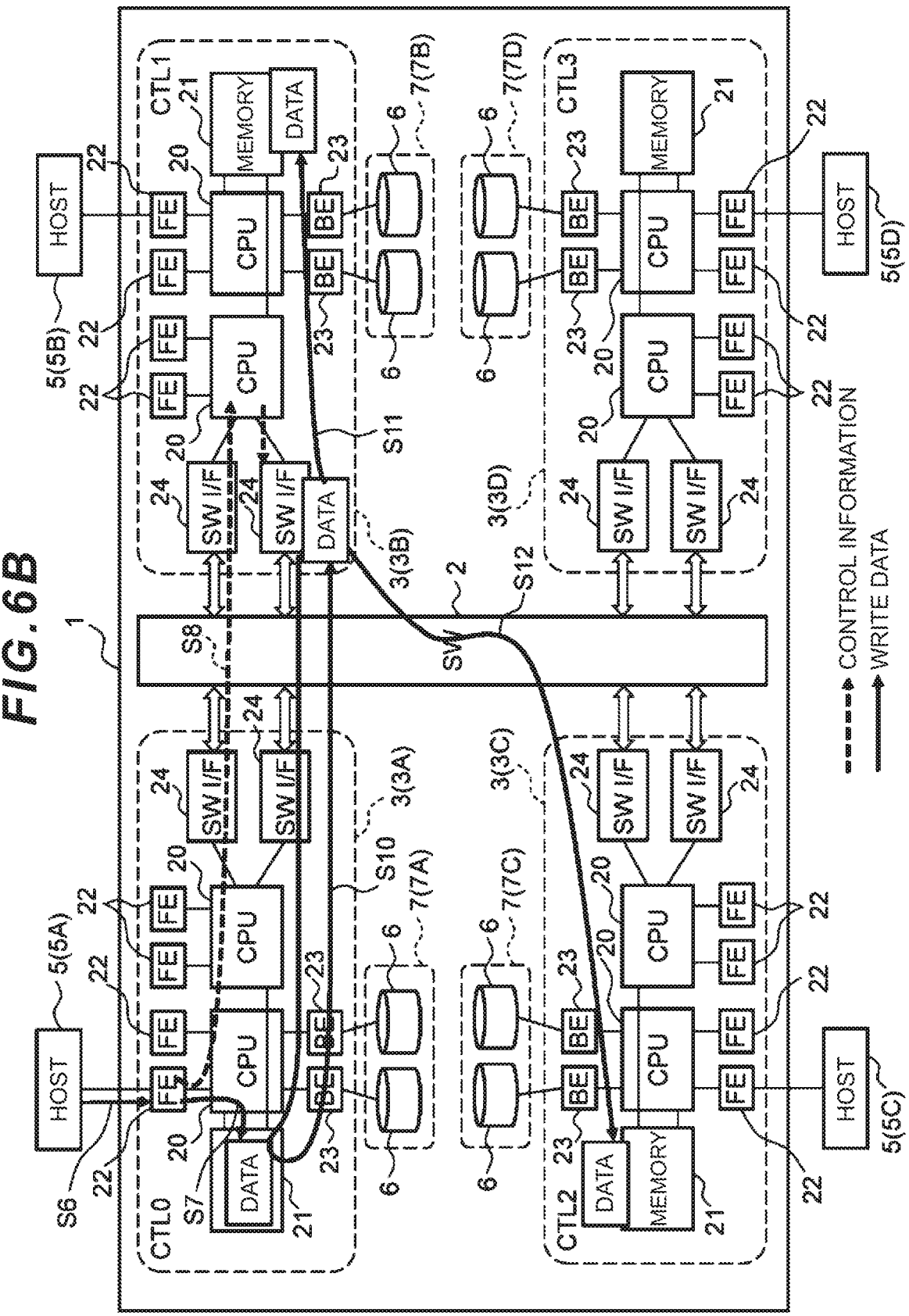
FIG. 6B is a block diagram serving to explain the flow of write processing in a conventional storage system.
Figure 7:
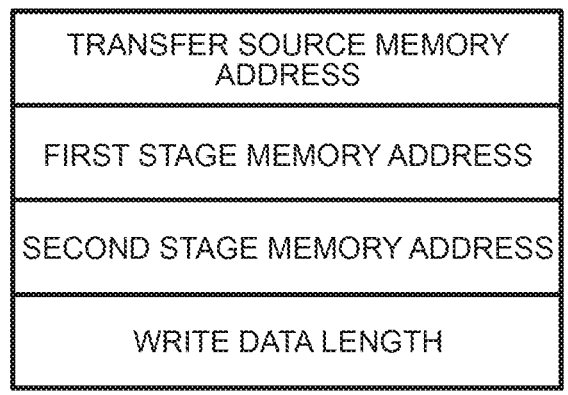
FIG. 7 is a conceptual diagram showing a configuration example of a transfer instruction.

(2) Flow of Data Write Processing in the Storage System (2-1) Overview of Write Processing
The flow of write processing in this storage system 1 will be explained next. Here, the flow of write processing in a conventional storage system will first be explained with reference to FIGS. 5 to 7. Here, the explanation will be provided based on the assumption that the storage system 1 according to the embodiment executes write processing by means of conventional process steps.

Furthermore, in the ensuing explanation, it is assumed that a write command whose write destination is a logical volume for which any MP 20A in the CPU 20 of storage controller 3B is responsible is supplied from the host 5A (FIG. 1) to the storage controller 3A (S1). Furthermore, in the ensuing explanation, it is assumed that each storage controller 3 in the storage system 1 has been configured to duplicate write data.

In the foregoing case, the protocol chip 34 (FIG. 2) of the front-end (hereinafter called the command-receiving front-end) 22 of the storage controller (receiving controller) 3A which has received the write command refers to the LDEV-MP mapping table 36 (FIG. 3) to specify the MP responsible for the logical volume which is the write-data write destination (hereinafter called the owner MP) 20A and stores this write command in the memory 21 of the storage controller (owner controller) 3B where the specified owner MP 20A resides (S2).

Furthermore, this owner MP 20A reads the write command which has been stored in the memory 21 (S3) and then sends the command response to the write command in step S2 to the protocol chip 34 of the command receiving front-end 22 (S4). Furthermore, this protocol chip 34 which has received the command response sends the command response to the host 5A which is the transmission source of this write command (S5).

Meanwhile, the protocol chip 34 of the command-receiving front-end 22 subsequently stores write data which has been transferred from the host 5A (S6) to the memory 21 in its own storage controller (receiving controller) 3A (S7). This is because, when write data has been transferred all at once from a plurality of hosts 5, there is a possibility that the data buffer (FE memory 35) provided in the front-end 22 of the receiving controller 3A will overflow, and therefore the write data from the hosts 5 is buffered in the memory 21.

Furthermore, upon completion of this write data transfer, the protocol chip 34 of the command-receiving front-end 22 sends a transfer completion status to that effect to the owner MP 20A (S8). Note that this transfer completion status contains an address of the write data which has been stored in the memory 21 of the receiving controller 3A.

Figure 8:
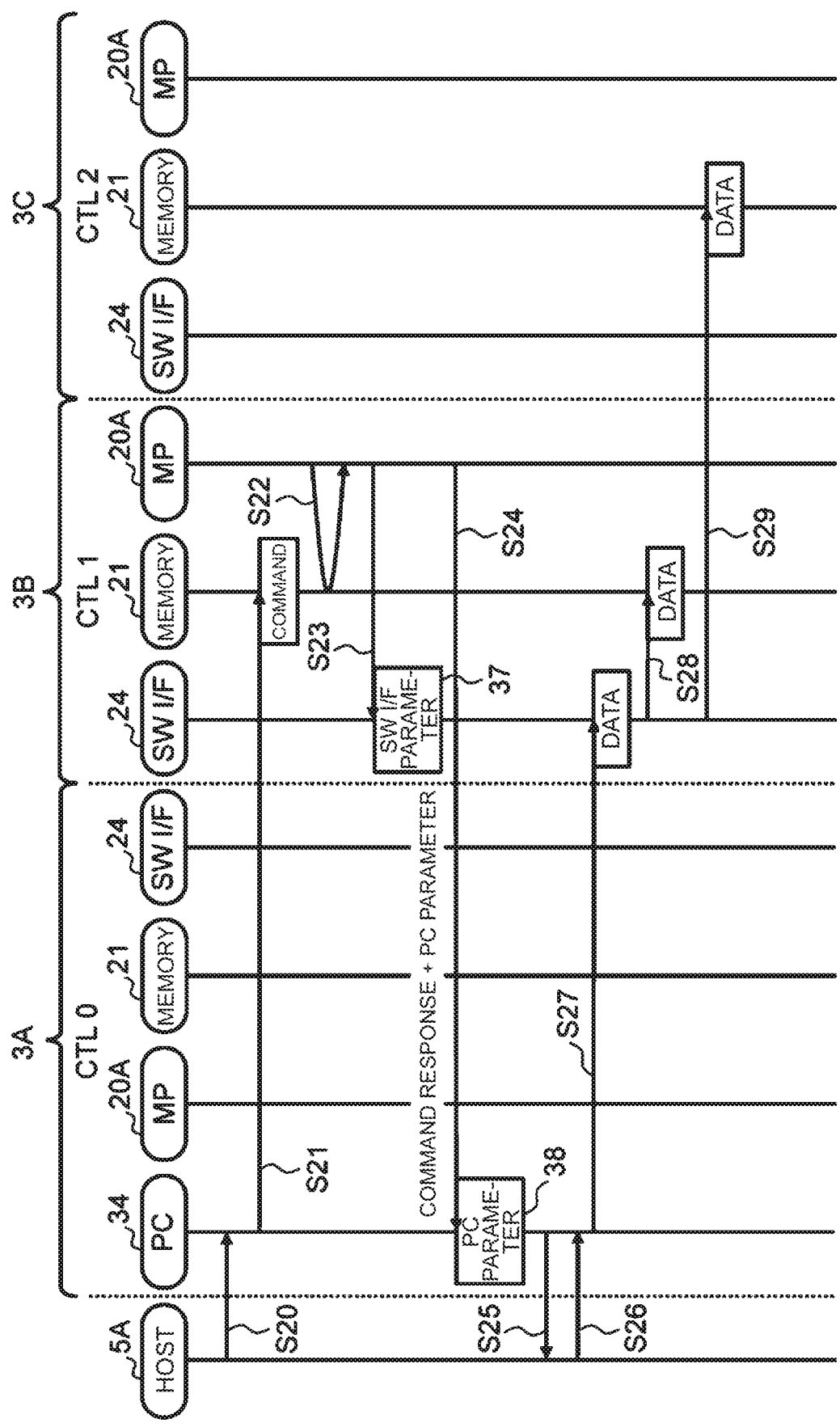
FIG. 8 is a sequence diagram serving to explain the flow of write processing in a storage system according to the embodiment.

Furthermore, the owner MP 20A which has received the transfer completion status refers to the LDEV-MP mapping table 31 (FIG. 3) to specify the pair controller 3C and, based on the specification result, sends a transfer instruction 33 which contains a transfer source memory address, a first stage memory address, a second stage memory address, and a write data length to the switch interface 24 in the owner controller 3B, as shown in FIG. 8 (S9).

Note that, in this transfer instruction 33, the transfer source memory address is an initial address of the write data in the memory 21 of the receiving controller 3A. Furthermore, the first stage memory address is a memory address which is the transfer destination of the write data which has been read from the memory 21 of the receiving controller 3A. The write data is transferred to the pair controller 3C via the owner controller 3B and therefore the address in the memory 21 of the owner controller 3B is designated as the first stage memory address. Furthermore, the second stage memory address is a write destination address of the write data in the pair controller 3C. As the second stage memory address, an address in the memory 21 of the pair controller 3C is designated.

When this transfer instruction 33 is provided, the switch interface 24 reads write data from the memory 21 of the receiving controller 3A based on the transfer instruction 33 (S10), stores the write data thus read in the address position designated by the transfer instruction 33 in the memory 21 of the owner controller 3B (S11), and stores this write data in the address position designated by the transfer instruction 33 in the memory 21 of the pair controller 3C (S12).

As detailed hereinabove, although the configuration in a conventional storage system involves the write data being buffered in the memory 21 of the receiving controller 3A (see S7) and read by the switch interface 24 of the owner controller 3, the overhead of such a data transfer to the owner controller 3 via the memory 21 of the receiving controller 3 is large and there has been a problem in that rapid write processing cannot be executed.

Therefore, one feature of the storage system 1 according to the embodiment is that write data is DMA-transferred to the owner controller 3 without passing through the memory 21 of the receiving controller 3.

Figure 9B:
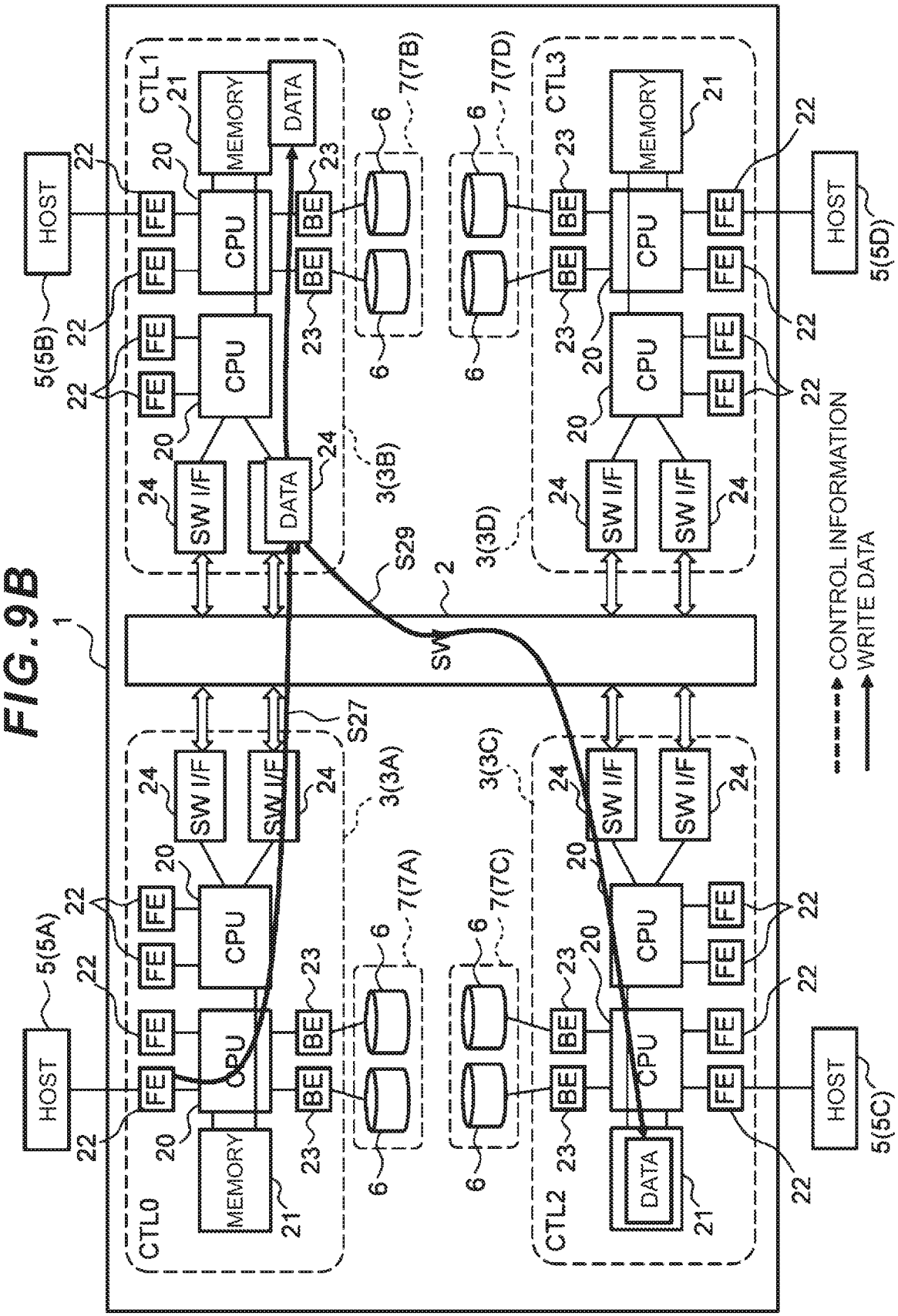
FIG. 9B is a block diagram serving to explain the flow of write processing in a storage system according to the embodiment.

FIGS. 8 to 9B show the flow of write processing in such a storage system 1 according to the embodiment. Here also, it is assumed that a write command whose write destination is a logical volume for which any MP 20A in the CPU 20 of the storage controller 3B is responsible is supplied from the host 5A to the storage controller 3A (S20). Moreover, in the ensuing explanation, it is assumed that each of the storage controllers 3 in the storage system 1 has been configured to duplicate write data.

In the foregoing case, the protocol chip 34 (FIG. 2) of the command-receiving front-end 22 of the storage controller (receiving controller) 3A which has received this write command refers to the LDEV-MP mapping table 36 (FIG. 3) to specify the owner MP 20A and stores this write command in the memory 21 of the storage controller (owner controller) 3B where the specified owner MP 20A resides (S21).

Furthermore, the owner MP 20A reads the write command which has been stored in the memory 21 (S22) and, based on the write command thus read, sends the address in the memory 21 of the corresponding pair controller 3C, the address in the memory 21 of its own storage controller (owner controller) 3B, and the processing to be executed at this time (hereinafter also called a 'function' or 'system function,' which is a 'double write' here) as a switch interface parameter 37 to the switch interface 24 in the owner controller 3B (S23).

Thereafter, the owner MP 20A sends a command response to the write command supplied from the protocol chip 34 of the command-receiving front-end 22 of the receiving controller 3A in step S21 to the protocol chip 34 of the command-receiving front-end 22. Furthermore, the owner MP 20A sends, in conjunction with the foregoing command response, an initial address of the data storage area corresponding to its own MP in the data buffer RAM 43 (FIG. 2) in the switch interface 24 of its own storage controller (owner controller) 3B (the data storage area which is mapped to the parameter storage area allocated to its own MP of the parameter storage register) to the protocol chip 34 as a protocol chip parameter 38 (S24).

Thus, the protocol chip 34 of the command-receiving front-end 22 which has received the command response from the owner MP 20A sends the command response to the host 5A which is the transmission source of this write command (S25).

Meanwhile, upon receiving the write data which has been transferred from the host 5A (S26), the protocol chip 34 of the command-receiving front-end 22 DMA-transfers the received write data to the data buffer RAM 43 of the switch interface 24 of the owner controller 3B (S27).

Thereupon, in the header of a data packet where write data has been stored (hereinafter PCI packet), the protocol chip 34 configures the destination of the PCI packet as the address notified by the owner MP 20A as the protocol chip parameter 38 in the aforementioned step S24. As a result, write data is stored in this address position in the data buffer RAM 43.

Then, when write data is stored in the data buffer RAM 43, the switch interface 24 of the owner controller 3B stores this write data in the address position in the memory 21 of its own storage controller (owner controller) 3B which was designated in the switch interface parameter 37 supplied from the owner MP 20A in step S24 (S28). Furthermore, the switch interface 24 stores the write data by means of a DMA transfer in the address position in the memory 21 of the pair controller 3C which was designated in the switch interface parameter 37 (S29).

Thus, in the storage system 1 according to this embodiment, the command-receiving front-end 22 of the receiving controller 3A directly writes the write data which has been transferred from the host 5A to the data buffer RAM 43 of the switch interface 24 of the owner controller 3B and therefore an overhead when transferring write data to the owner controller 3 via the memory 21 of the receiving controller 3A is not generated, and the response performance of the whole storage system 1 from the perspective of the host 5A can be improved by the same measure.

(2-2) Configuration of Switch Interface Parameter

The configuration of the switch interface parameter will be explained next with reference to FIG. 10A. As is also clear from FIG. 10A, the switch interface parameter 37 has a data size of 24 bytes, where 8 bits constitute one byte. Furthermore, the first 2 bytes (16 bits) are used as a function number field (the 'function number' field in FIG. 10A) which stores the function numbers of the system functions which are to be executed by the switch interface 24.

Here, as shown in FIG. 10B, these 'system functions' include 'single write' in which write data is written to the memory apparatus 7 (FIG. 1) without being multiplexed, 'double write' in which write data is written in duplicate to the memory apparatus 7, 'CRC check' in which the accuracy of write data is checked based on a CRC (Cyclic Redundancy Check) code which has been added to the write data, and 'other CTL read (data)' in which data is read from another storage controller 3.

In this embodiment, a unique identification number is pre-assigned as a function number to each system function that can be executed by the switch interface 24, and this function number is stored in the function number field of the switch interface parameter 37. For example, in the case of the 'double write' system function, a function number ('0x0001' in the example of FIG. 10D) which was assigned to the 'double write' function has been stored in the function number field, as shown in FIG. 10D.

Furthermore, the next one byte (8 bits) in the function number field is used as a function auxiliary number field (the 'function auxiliary number' field in FIG. 10A) for storing the numbers of auxiliary functions (hereinafter called function auxiliary numbers) of the system functions (hereinafter called the designated system functions) whose function numbers have been stored in the function number field. Note that the auxiliary functions 'single write' and 'double write,' include 'T10DIF Insert' in which a check code is added to each data block when transferring write data between storage controllers 3 and 'T10DIF Check' in which user data accuracy is determined based on the check code, as shown in FIG. 10C.

Furthermore, the next one byte (8 bits) in the function auxiliary number field is used as the target CTL number field ('target CTL number' field in FIG. 10A) which stores the controller numbers of the storage controllers 3 which are targeted for the designated system functions. For example, in the case of the 'double write' system function, the controller number of the pair controller number 3 is stored in this target CTL number field, as shown in FIG. 10D.

Furthermore, the eight bytes (64 bits) following the target CTL number field are used as the system function usage address field (the field of the 'system function usage address' in FIG. 10A) which stores the address (hereinafter called the system function usage address) in the storage controller 3 which is targeted by the designated system function (the storage controller 3 whose controller number is stored in the target CTL number field) which is used to realize the designated system function. For example, in the case of the designated system function 'double write,' the address where write data is to be stored in the memory 21 in the pair controller number 3 is stored in this system function usage address field, as shown in FIG. 10D.

Note that, in FIG. 10D, the system function usage address field has been divided into two areas of four bytes each ('write destination address 1 of CTL2' and 'write destination address 2 of CTL2') where the four bytes of the first half (the write destination address 1 of CTL2' field in FIG. 10D) are used when the target address has a number of bits of 32 bits or less, and the total eight bytes of the first and latter halves (the fields 'write destination address 1 of CTL2' and write destination address 2 of CTL2' in FIG. 10D) are used when the target address has a number of bits from 32 to 64 bits.

The next eight bytes (64 bits) of the system function usage address field are used as the system function-specific usage field (the 'system function-specific usage area' field in FIG. 10A) which stores a unique address (hereinafter called a system function-specific usage address) which is used by a designated system function to realize the system function. For example, in the case of the designated system function 'double write,' the address where write data is to be stored in the memory 21 in its own storage controller (owner controller) 3 is stored in this system function-specific usage address field, as shown in FIG. 10D.

Note that, in FIG. 10D, the system function-specific usage address field has been divided into two areas of four bytes each ('write destination address 1 of own CTL' and 'write destination address 2 of own CTL') where the four bytes of the first half (the write destination address 1 of own CTL' field in FIG. 10D) are used when the target address has a number of bits of 32 bits or less, and the total eight bytes of the first and latter halves (the fields 'write destination address 1 of own CTL' and write destination address 2 of own CTL' in FIG. 10D) are used when the target address has a number of bits from 32 to 64 bits.

The next four bytes (32 bits) of the system function-specific usage field store a parity (LRC: Longitudinal Redundancy Check) which has been calculated based on byte 0 to byte 19 of the switch interface parameter 37.

FIG. 10D shows a configuration example of the switch interface parameter 37 when write data is to be double-written to its own storage controller 3 and the 'CTL2' storage controller 3. An explanation is omitted here because the details of FIG. 10D are as mentioned earlier.

(2-3) Detailed Configuration of Switch Interface

Figure 11:
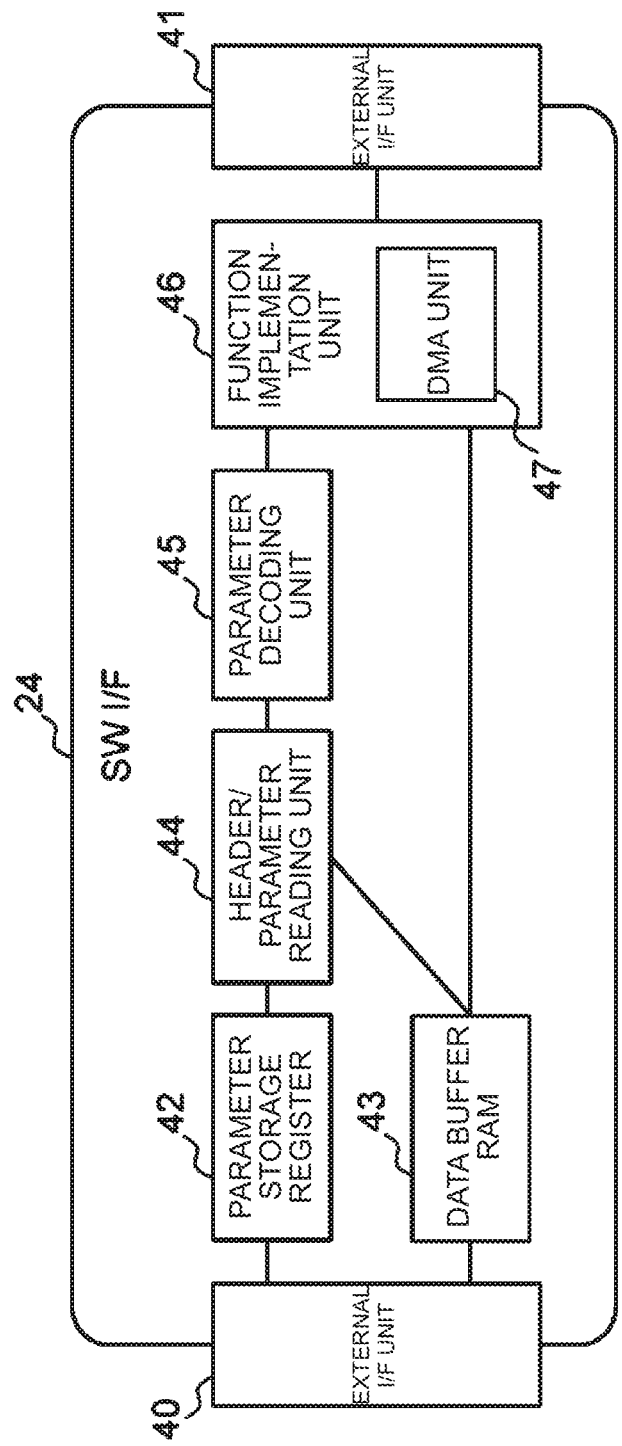
FIG. 11 is a block diagram showing a detailed configuration of a switch interface.

FIG. 11 shows a detailed configuration of the switch interface 24 according to this embodiment. As shown in FIG. 11, the switch interface 24 is configured by comprising a first external interface unit 40, a second external interface unit 41, a parameter storage register 42, the data buffer RAM (Random Access Memory) 43, a header/parameter reading unit 44, a parameter decoding unit 45, and a function implementation unit 46.

Note that the first external interface unit 40, second external interface unit 41, parameter storage register 42, data buffer RAM 43, header/parameter reading unit 44, parameter decoding unit 45, and function implementation unit 46 may be of any hardware configuration and software configuration.

Figure 12:
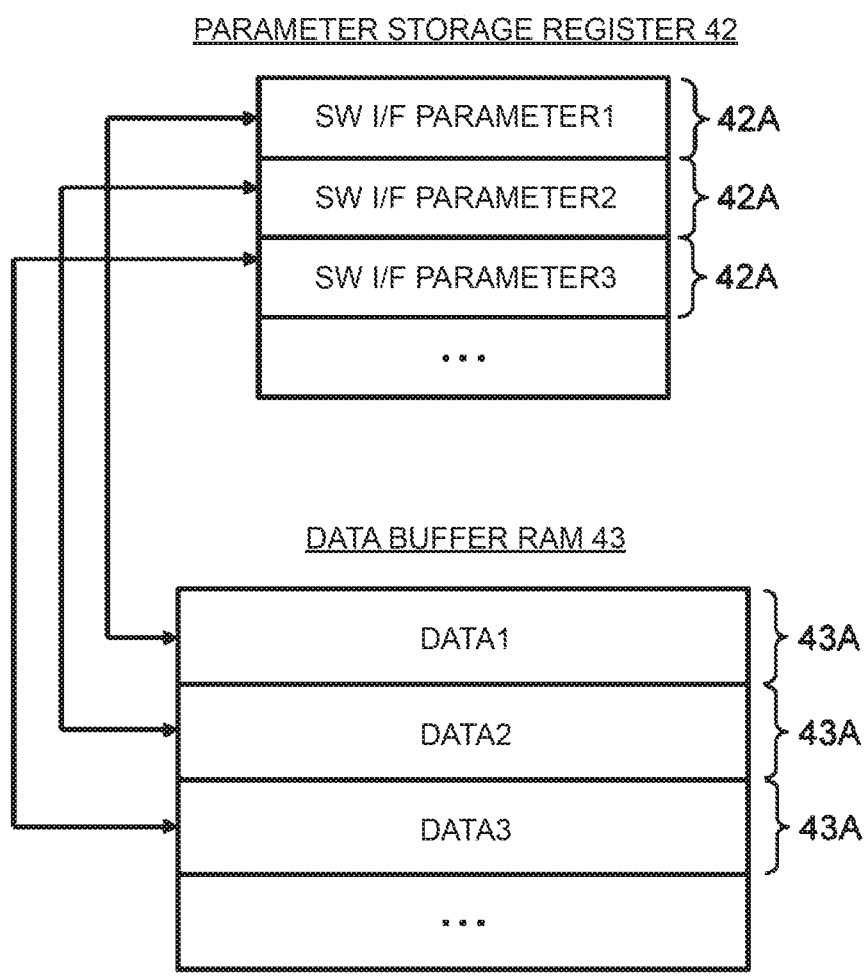
FIG. 12 is a conceptual diagram serving to explain mapping relationships between parameter storage areas of a parameter storage register and RAM data storage areas of a data buffer.

The first and second external interface units 40 and 41 are interfaces which exercise protocol control during communications with the MP 20A in the same storage controller 3, and the other storage controllers 3 via the PCIe switch 2 (FIG. 1). Furthermore, the parameter storage register 42 is a register for temporarily storing and holding the aforementioned switch interface parameter 37 that has been supplied from the MP 20A. As shown in FIG. 12, the memory area of the parameter storage register 42 is managed subdivided into a plurality of parameter storage areas 42A which are each mapped to each of the MP 20A in its own storage controller 3.

The data buffer RAM 43 is memory for temporarily storing and holding a PCI packet (write data) which has been DMA-transferred from the protocol chip 34 (FIG. 1) of the front-end 22 as described earlier. The memory area of the data buffer RAM 43 is also managed subdivided into a plurality of data storage areas 43A which are each mapped to each of the parameter storage areas 42A of the parameter storage register 42.

The header/parameter reading unit 44 is a function unit which comprises a function which reads the switch interface parameter 37 corresponding to the write data when the write data has been stored in the data buffer RAM 43 by the protocol chip 34 of the command-receiving front-end 22.

Furthermore, the parameter decoding unit 45 is a function unit which comprises a function which decodes the content of the switch interface parameter 37 which is supplied from the header/parameter reading unit 44. More specifically, the parameter decoding unit 45 reads the system function, auxiliary function, target CTL number, system function usage address, and system function-specific usage address which have been designated as described earlier in the switch interface parameter 37 from the switch interface parameter 37 that has been supplied from the header/parameter reading unit 44, and outputs the information thus read to the function implementation unit 46.

The function implementation unit 46 is a function unit comprising a function which executes a system function such as double write based on the result of decoding the switch interface parameter 37 supplied from the parameter decoding unit 45. The function implementation unit 46 comprises a DMA (Direct Memory Access) unit 47 comprising a function which DMA-transfers data to realize the 'double write' system function, for example, and stores data and commands and the like in the memory 21 of the required storage controller 3 in the cluster (storage system 1) via the second external interface unit 41 by means of the DMA unit 47.

(2-4) Flow of Processing by the Switch Interface During Double Write Processing

FIGS. 13A to 16B, in which the same reference signs are shown assigned to corresponding parts as in FIGS. 8 to 9B and FIG. 11, show a more detailed flow of processing during the double write processing described earlier with reference to FIGS. 8 to 9B.

Figure 13A:
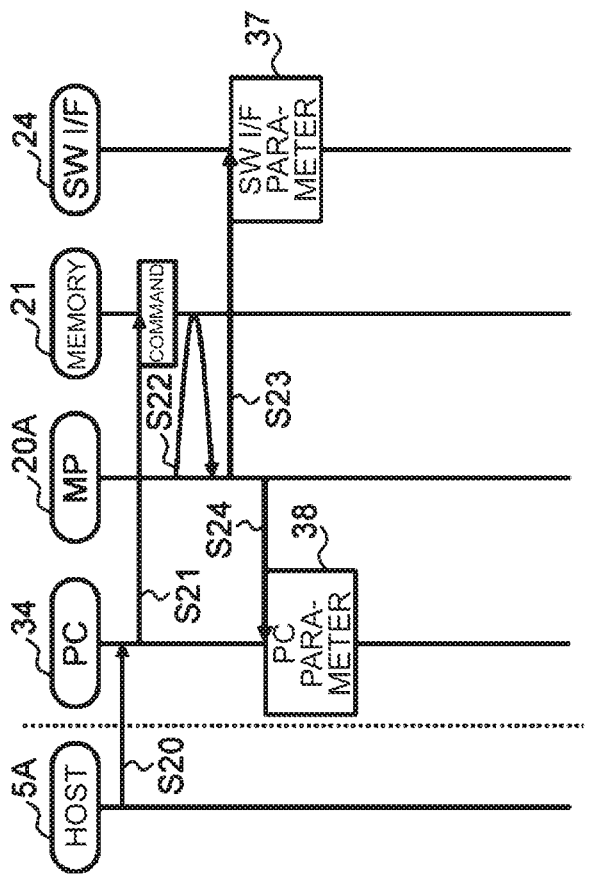
FIGS. 13A and 13B are a sequence diagram and a block diagram serving to explain more specifically the flow of processing during a double write.
Figure 13B:
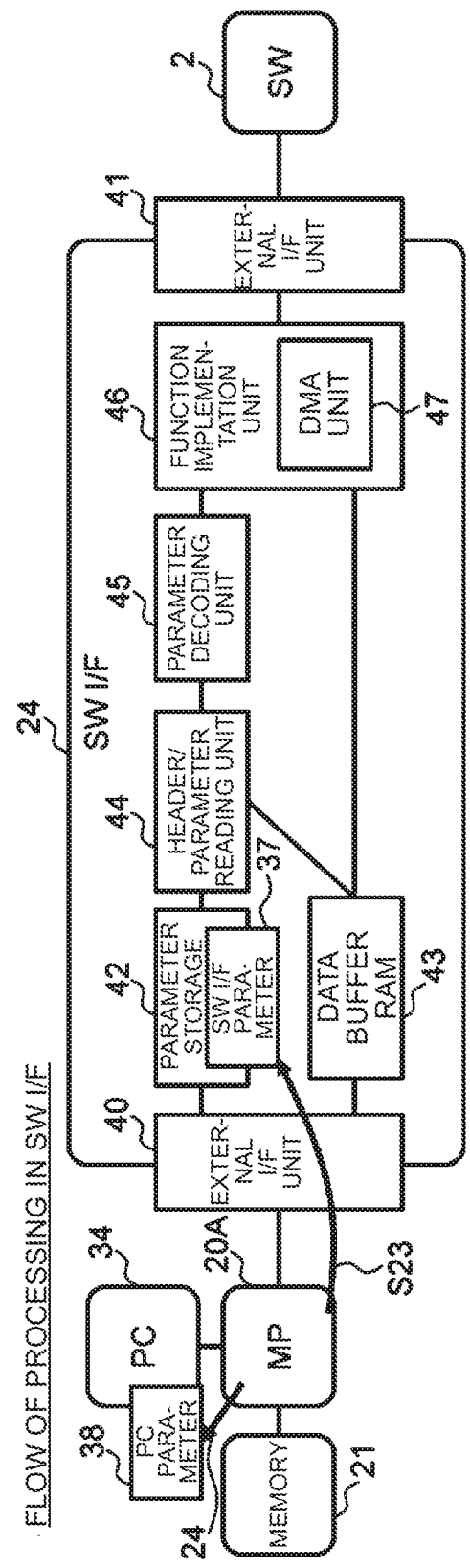

When the owner MP 20A supplies the switch interface parameter 37 according to the write command supplied from the host 5A to the switch interface 24 of the owner controller 3B in S23 of FIG. 13A, as shown in FIG. 13B, the owner MP 20A stores the switch interface parameter 37 in the parameter storage area 42A which corresponds to the owner MP 20A in the parameter storage register 42.

Furthermore, the owner MP 20A issues notification of the initial address of the data storage area 43A (FIG. 12) in the data buffer RAM 43 which corresponds to the parameter storage area 42A storing the switch interface parameter 37 in the parameter storage register 42 to the protocol chip 34 of the command-receiving front-end 22 as the protocol chip parameter 38 (S24).

Figure 14A:
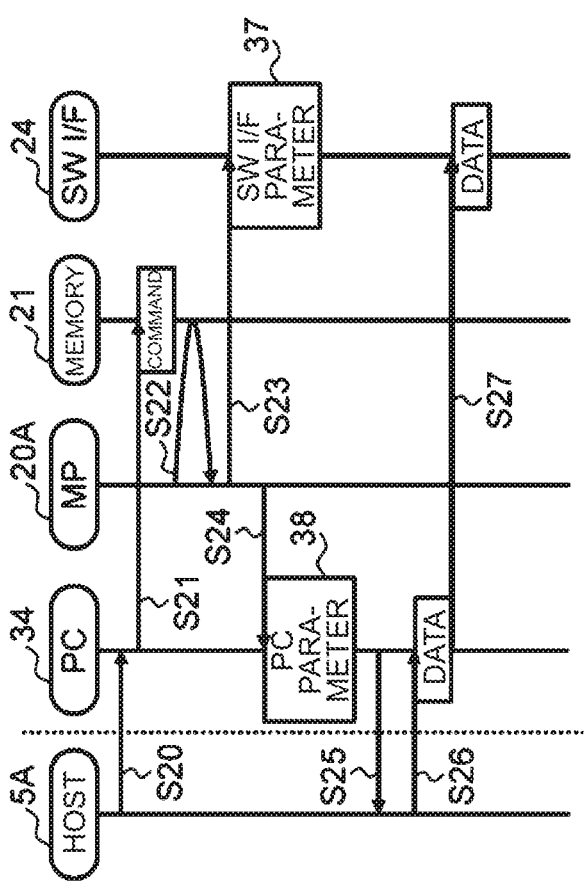
FIGS. 14A and 14B are a sequence diagram and a block diagram serving to explain more specifically the flow of processing during a double write.
Figure 14B:
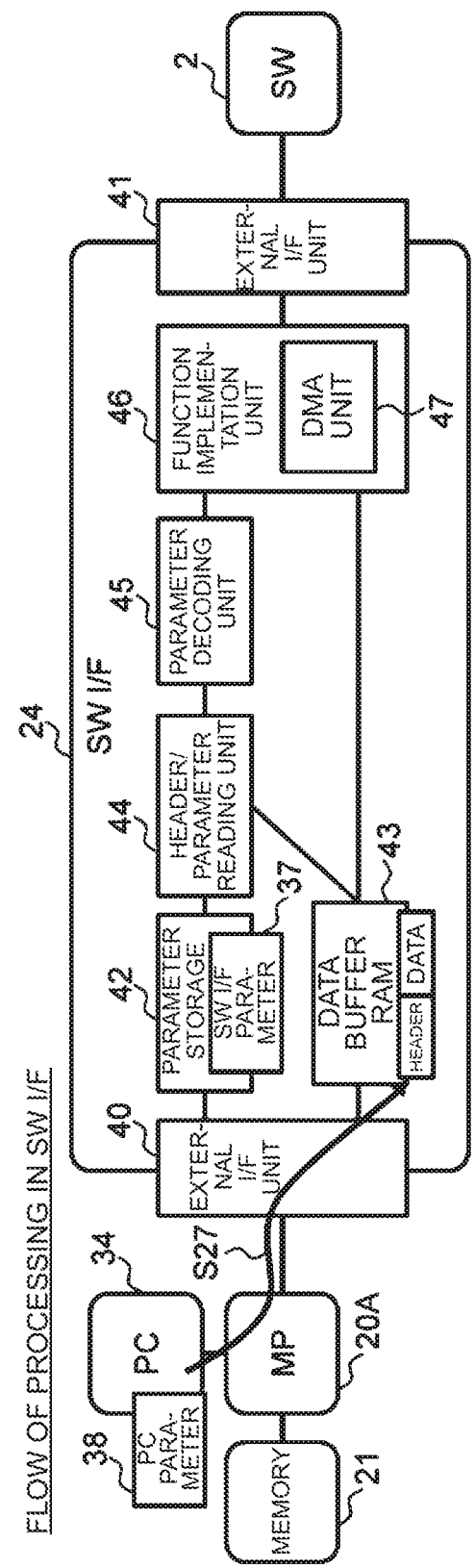

Thereafter, when the write data has been transferred from the host 5A (S26 in FIG. 14A), the protocol chip 34 converts the write data to a PCI packet and DMA-transfers same to the data buffer RAM 43 of the switch interface 24 in the owner controller 3B, as shown in FIG. 14B (S27).

Thereupon, the protocol chip 34 configures the write destination of the data in the PCI packet as the address that was notified as the protocol chip parameter 38 by the owner MP 20A in step S24. As a result, among the data storage areas 43A in the data buffer RAM 43 of the switch interface 24, this write data is stored in the data storage area 43A which is mapped to the parameter storage area 42A in the parameter storage register 42 to which the owner MP 20A wrote the switch interface parameter 37 in step S23.

Figure 15A:
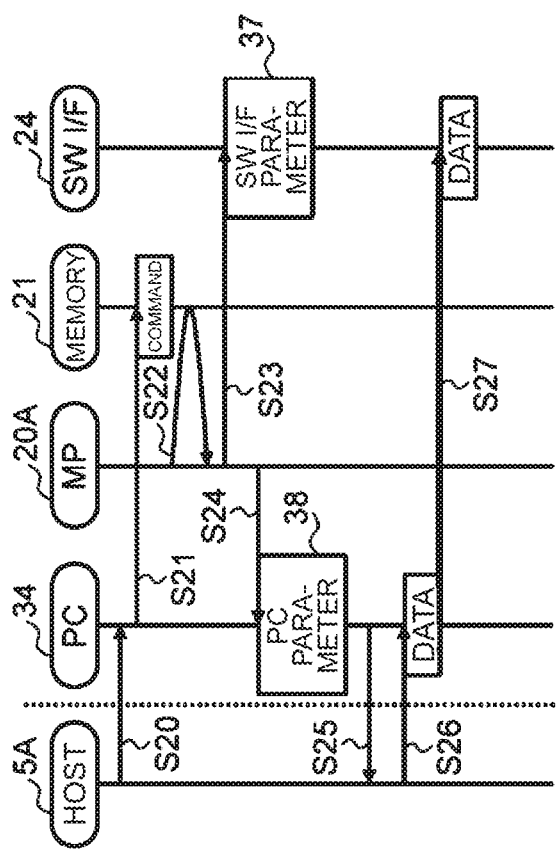
FIGS. 15A and 15B are a sequence diagram and a block diagram serving to explain more specifically the flow of processing during a double write.
Figure 15B:
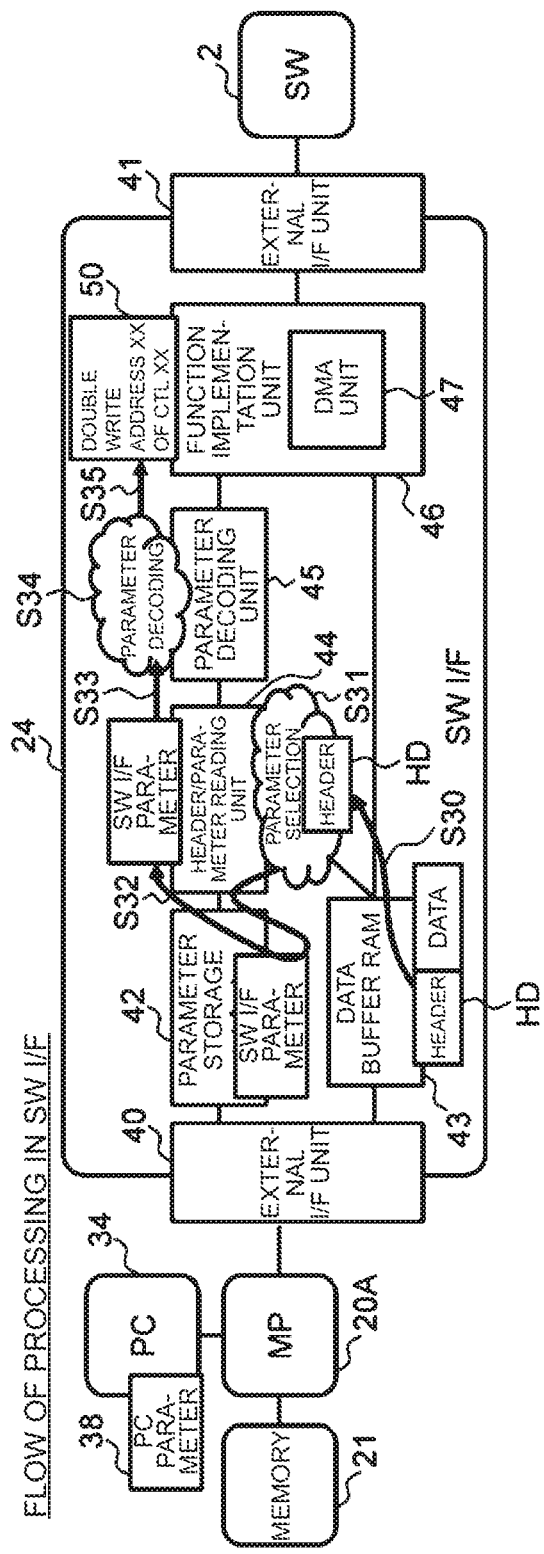

Meanwhile, when the write data is stored in the data buffer RAM 43 (S27 of FIG. 15A), the header/parameter reading unit 44 of the switch interface 24 of the owner controller 3B reads the header HD of the PCI packet as shown in FIG. 15B (S30).

Furthermore, the header/parameter reading unit 44 specifies the data storage area 43A in the data buffer RAM 43 where the PCI packet is stored based on the destination address of the PCI packet which is stored in the header HD of the PCI packet thus read and specifies (selects) the parameter storage area 42A in the parameter storage register 42 which is mapped to this data storage area 43A. The header/parameter reading unit 44 then reads the switch interface parameter 37 stored in the parameter storage area 42A from the specified parameter storage area 42A (S32) and outputs same to the parameter decoding unit 45 (333).

Furthermore, the parameter decoding unit 45 decodes the switch interface parameter 37 which has been output from the header/parameter reading unit 44 (S34) and outputs the decoding result to the function implementation unit 46 (S35). Here, the decoding results which are output from the parameter decoding unit 45 to the function implementation unit 46 are the fact that the system function which is to be executed is 'double write,' and a parameter 50 such as the controller number of the storage controller 3C which is the double write destination and the write destination of the write data in the storage controller 3, and the write destination address of the data in the logical volume managed by its own storage controller 3B.

Figure 16A:
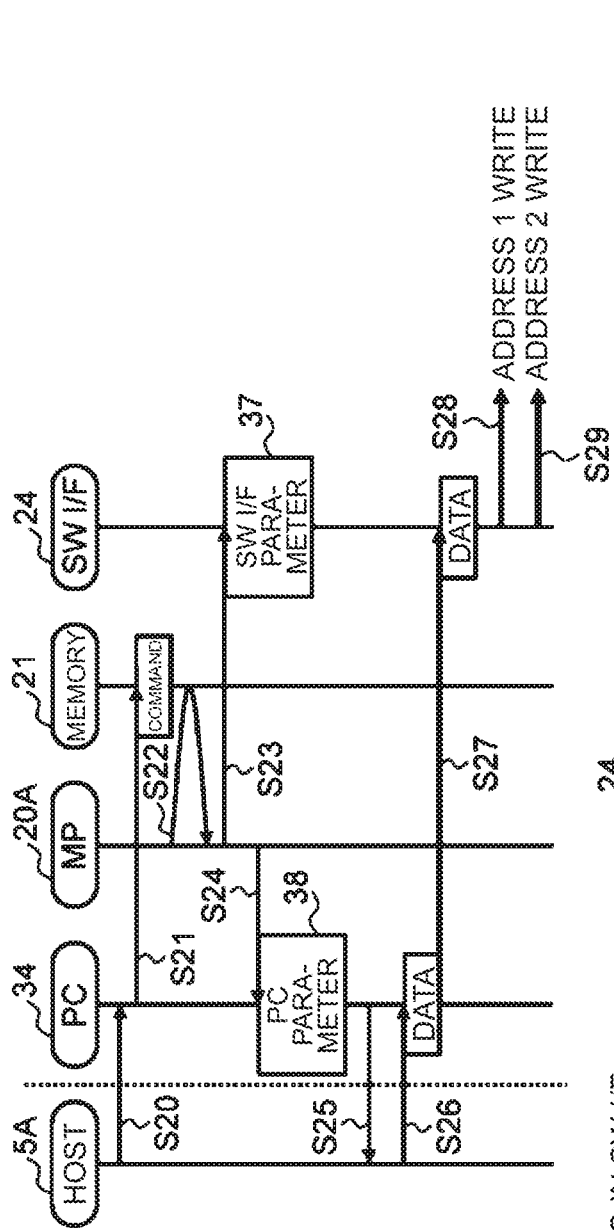
FIGS. 16A and 16B are a sequence diagram and a block diagram serving to explain more specifically the flow of processing during a double write.
Figure 16B:
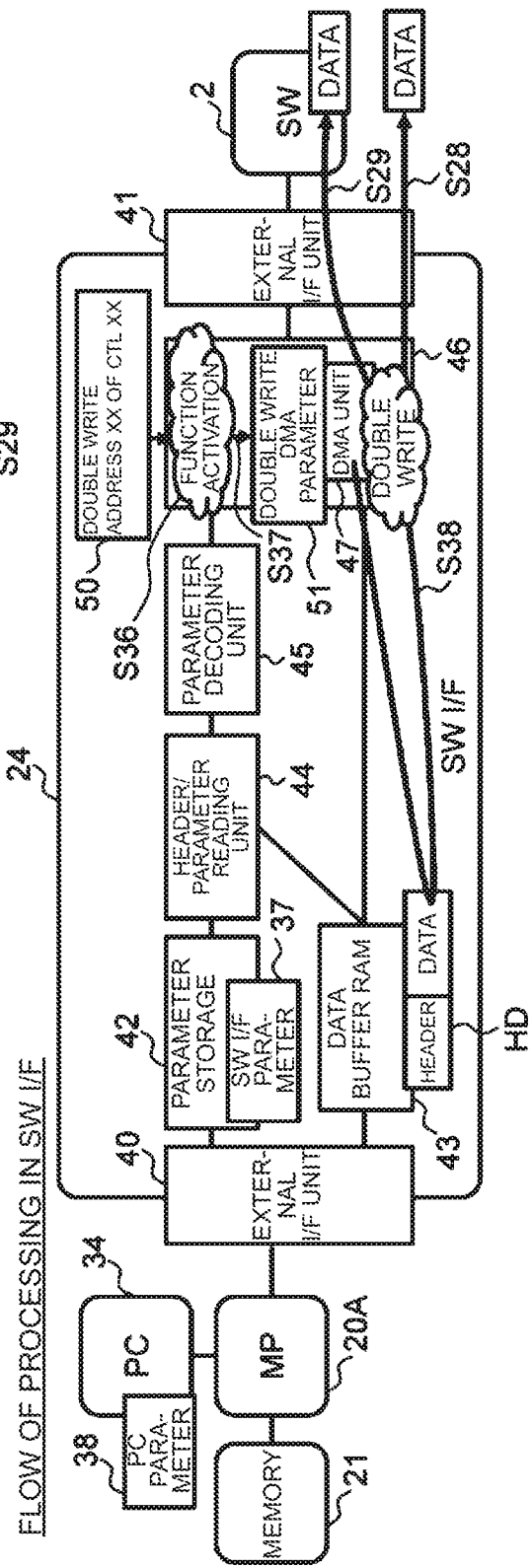

As shown in FIG. 16B, the function implementation unit 46 activates the corresponding system function based on the parameter 50 (336) and supplies the parameter 50 to the DMA unit 47 as the double write DMA parameter 51 (S37).

The DMA unit 47 thus reads write data from the data buffer RAM 43 according to the DMA parameter 51 (S38), DMA-transfers the write data thus read to the memory 21 in its own storage controller 3B (S28), and DMA-transfers the write data to the memory 21 of the storage controller (pair controller) 3C of the duplication destination via the PCIe switch 2 (S29). Note that the write data which has been DMA-transferred in this manner to the memory 21 of its own storage controller 3B and to the memory 21 of the pair controller 3C is subsequently stored in the memory apparatus 7 (FIG. 1) with predetermined timing.

(2-5) Switch Interface Parameter Management Method

Note that, as methods for managing the switch interface parameter 37 in the switch interface 24, a first management method in which, in step S23 of FIGS. 13A to 16A described earlier, the owner MP 20A always overwrites the switch interface parameter 37 to the self-allocated parameter storage area 42A in the parameter storage register 42 of the switch interface 24 and a second management method in which the switch interface 24 issues notification of completion of the system function executed according to the switch interface parameter 37 to the owner MP 20A by means of a status and the MP 20A awaits the notification and releases the parameter storage area 42A, may be considered.

In the foregoing case, if the fact that one MP 20A uses only one system function according to the command from the host 5 is considered, the response performance of the storage system 1 from the perspective of the host 5 can be improved and the implementation also simplified by applying the first management method.

However, when the switch interface parameter 37 has been stored at the wrong address due to overwriting, the wrong processing is executed due to the erroneous switch interface parameter 37 and consequently there is a risk of causing data destruction or data corruption. Therefore, also in the sense of preventing such a situation, the second management method is desirably applied as the management method for the switch interface parameter 37 in the switch interface 24.

(2-6) Double Write Processing

Figure 17:
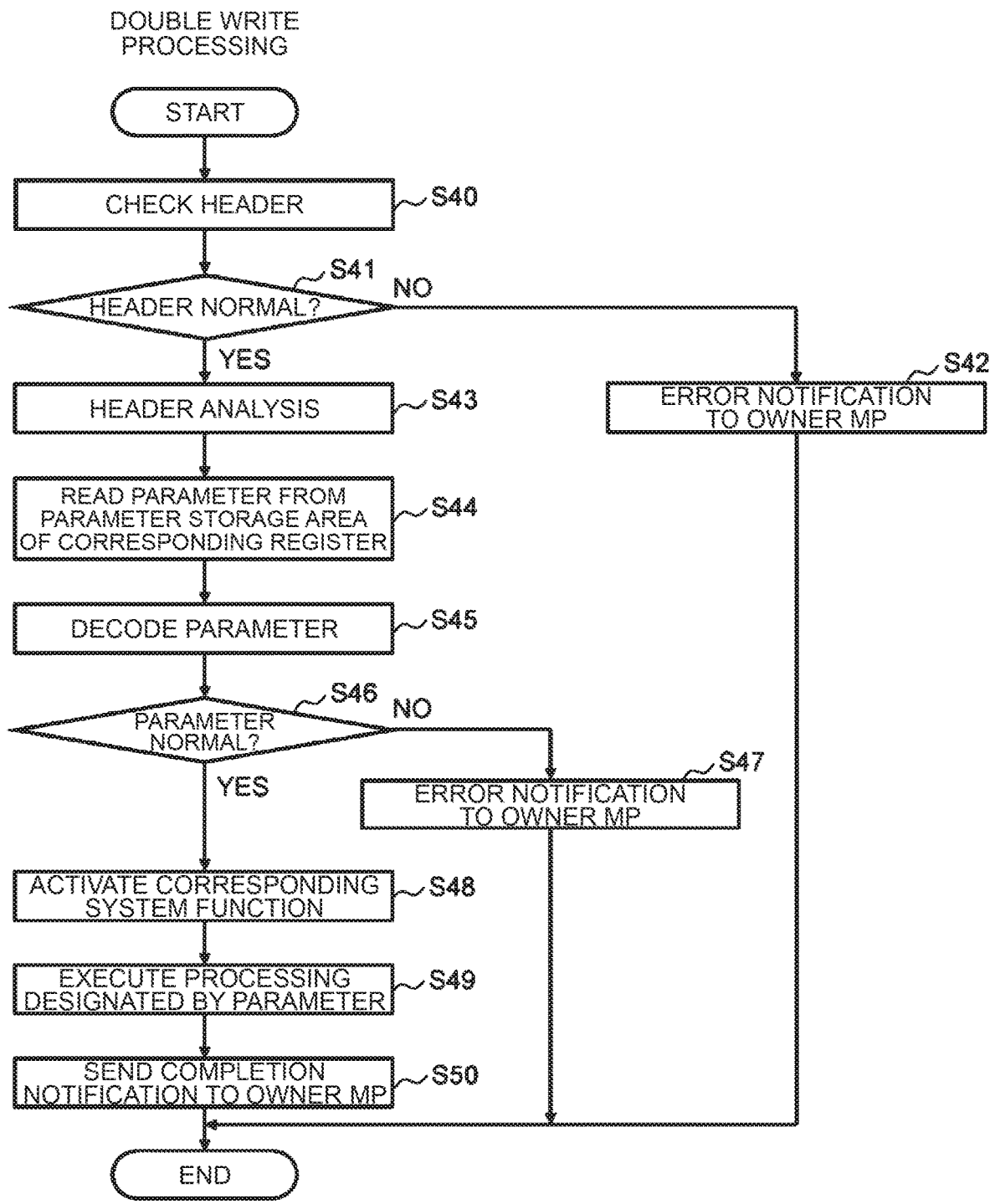
FIG. 17 is a flowchart showing the process steps of double write processing.

FIG. 17 shows the flow of serial processing (double write processing here) which is executed in the switch interface 24 of the owner controller 3B when the write data from the protocol chip 34 of the command-receiving front-end 22 has been received in step S27 of FIG. 8. The double write processing is processing which is executed for one PCI packet and the same processing is repeated each time one PCI packet is stored in the data buffer RAM.

More specifically, in the switch interface 24, when the header/parameter reading unit 44 detects the fact that one PCI packet has been stored in the data buffer RAM 43, the write processing shown in FIG. 17 is started, and first the header/parameter reading unit 44 executes an accuracy check of the header HD (FIG. 15B) of this PCI packet (S40) and determines whether the header HD is normal (S41).

Further, upon obtaining a negative result in this determination, the header/parameter reading unit 44 issues an error notification to the owner MP 20A (S42) and then ends the double write processing. Therefore, in the foregoing case, the owner MP 20A issues an error notification to the host 5A and has this write data transferred once again.

However, upon obtaining an affirmative result in the determination of step S41, the header/parameter reading unit 44 reads the destination address of the PCI packet from the header HD which was subjected to the accuracy check in step S40 (the address of the data storage area 43A in the data buffer RAM 43 where the PCI packet is to be stored), and specifies the parameter storage area 42A in the parameter storage register 42 which has been mapped to this address, based on the address thus read (S43).

The header/parameter reading unit 44 then reads the switch interface parameter 37 from the parameter storage area 42A specified in step S43 in the parameter storage register 42 and transfers the switch interface parameter 37 to the parameter decoding unit 45 (S44).

The parameter decoding unit 45 decodes the switch interface parameter 37 which has been supplied from the header/parameter reading unit 44 and outputs the decoding result to the function implementation unit (S45). Furthermore, the parameter decoding unit 45 determines whether the switch interface parameter 37 is normal based on the LRC contained in the switch interface parameter 37 (S46).

Further, upon obtaining a negative result in this determination, the parameter decoding unit 45 issues an error notification to the owner MP 20A (S47) and then ends the double write processing. Therefore, in the foregoing case, the owner MP 20A issues an error notification to the host 5A and has the switch interface parameter 37 transferred once again.

However, upon obtaining an affirmative result in the determination of step S45, the parameter decoding unit 45 activates the system function designated in the switch interface parameter 37 in the function implementation unit 46 (S48). Furthermore, the function implementation unit 46 executes the processing which has been designated by the switch interface parameter 37 based on the activated system function (S49).

For example, when the processing designated by the switch interface parameter 37 is double writing of write data, the function implementation unit 46 activates the DMA unit 47 and supplies the aforementioned DMA parameter 51 (FIG. 16B) to the DMA unit 47. Thus, the DMA unit 47 DMA-transfers the write data to the memory 21 in its own storage controller 3B as described earlier according to the DMA parameter 51 and also DMA-transfers the write data to the memory 21 of the pair controller 3C.

Further, when the processing designated by the switch interface parameter 37 is complete, the function implementation unit 46 issues a completion notification to that effect to the owner MP 20A (S50) and then ends the double write processing.

(3) Application to Other System Functions

Although the flow of processing during a double write was described hereinabove, according to this storage system 1, other processing (system functions) such as a 'read' and 'CRC check' and the like can be executed by means of the same processing flow as for a double write. The flow of read processing will be explained hereinbelow as an example.

Figure 18:
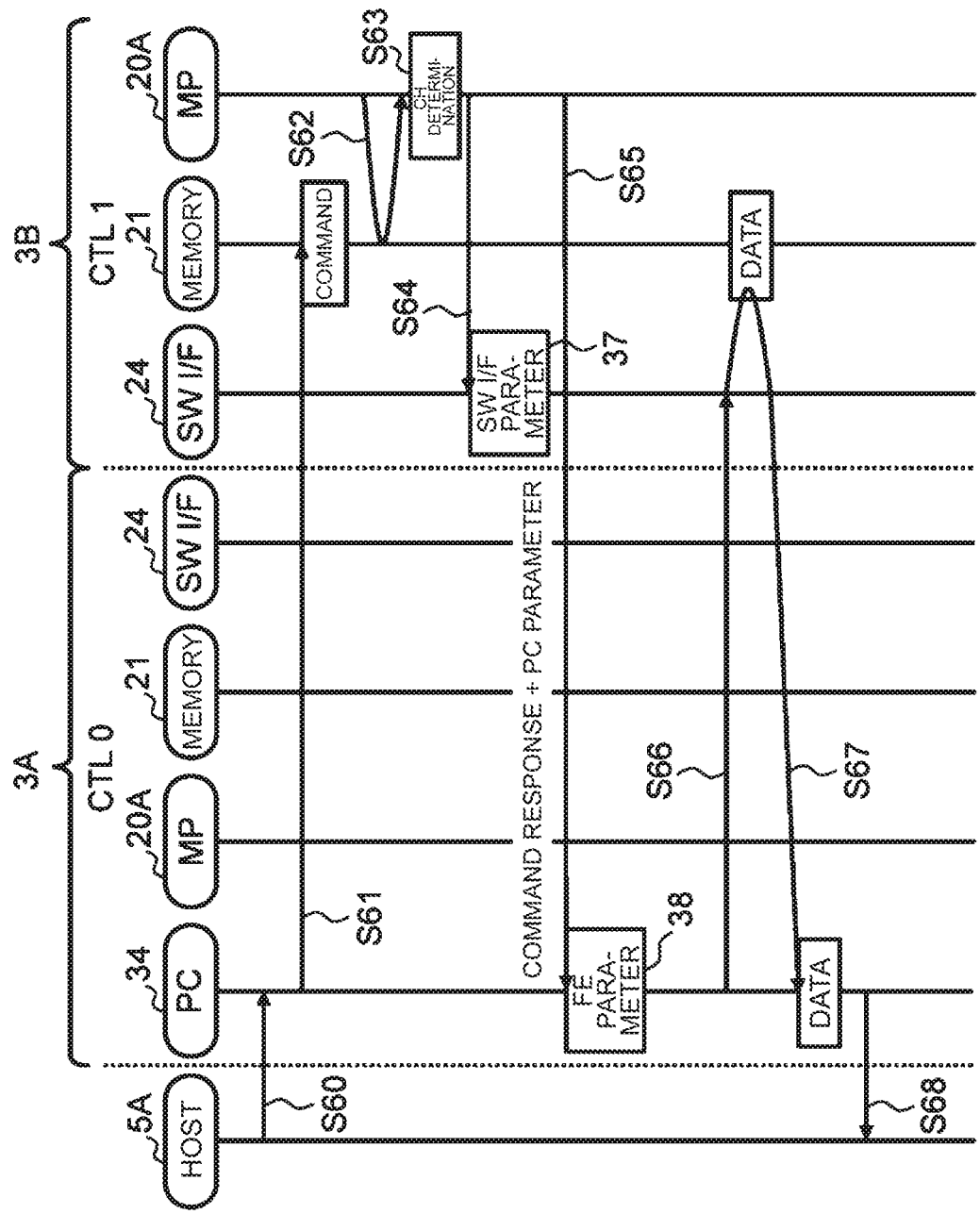
FIG. 18 is a sequence diagram serving to explain the flow of processing during reading.

FIG. 18 shows the flow of read processing when a read command is supplied from the host 5A to the storage controller 3A. Here, it is assumed that the data targeted by the read command is stored in a logical volume which is managed by any MP 20A of the storage controller 3B.

In the foregoing case, upon receiving this read command (S60), the protocol chip 34 of the front-end 22 of the storage controller 3A refers to the LDEV-MP mapping table 36 (FIG. 3) to specify the owner MP 20A and stores the read command in the memory 21 of the storage controller (owner controller) 3B where the specified owner MP 20A resides by means of a DMA-transfer (S61).

Furthermore, the owner MP 20A reads the read command stored in the memory 21 (S62) and executes a cache hit determination which determines whether the requested data exists in the memory 21 based on the read command thus read (S63). Here, it is assumed that the requested data exists in the memory 21.

Therefore, the owner MP 20A generates a switch interface parameter 37 in which the function number which responds to the system function 'read (data)' is stored in the function number field ('function number' field in FIG. 10A) of the switch interface parameter 37, in which the controller number of its own storage controller is stored in the target CTL number field (the 'target CTL number' field in FIG. 10A), and in which the read destination address is stored in the system function usage address field (system function usage address' field in FIG. 10A), and stores the switch interface parameter 37 in the parameter storage area 42A (FIG. 12) mapped to its own MP in the parameter storage register 42 (FIG. 11) of the switch interface 24 (S64).

Thereafter, the owner MP 20A sends a command response to the read command supplied from the protocol chip 34 of the command-receiving front-end 22 of the receiving controller 3A in step S61 to the protocol chip 34 of the command-receiving front-end 22. Furthermore, the owner MP 20A sends, in conjunction with the foregoing command response, an initial address of the data storage area 43A corresponding to its own MP in the data buffer RAM 43 (FIG. 2) in the switch interface 24 of its own storage controller (owner controller) 3B (the data storage area 43A which is mapped to the parameter storage area 42A allocated to its own MP of the parameter storage register 42) to the protocol chip 34 as a protocol chip parameter 38 (S65).

Thus, the protocol chip 34 of the command-receiving front-end 22 which has received the command response from the owner MP 20A generates a PCI packet whose destination is the address supplied as the protocol chip parameter 38 in step S65 to the switch interface 24 of the owner controller 3B. Furthermore, the protocol chip 34 stores the generated PCI packet at the address supplied as the protocol chip parameter 38 in step S65 in the data buffer RAM 43 of the switch interface 24 of the owner controller 3B (S66).

As a result, the header/parameter reading unit 44 (FIG. 11) of the switch interface 24 reads the switch interface parameter 37 from the parameter storage area 42A of the parameter storage register 42 which corresponds to the data storage area 43A of the data buffer RAM 43 where the PCI packet is stored. The parameter decoding unit 45 (FIG. 11) of the switch interface 24 then decodes the switch interface parameter 37 and activates the system function 'read' in the function implementation unit 46 (FIG. 11) based on the decoding result. As a result, the requested data is read by the function implementation unit 46 from the corresponding logical volume and transferred as read data to the protocol chip 34 of the command-receiving front-end 22 via the external interface unit 41 (FIG. 11) (S67).

Thus, the protocol chip 34 of the command-receiving front-end 22 which has received this read data transfers the read data to the host 5A which is the transmission source of the read command (S68).

(4) Effect of this Embodiment

Thus, in the storage system according to this embodiment, write data from the host 5 can be transferred directly to the owner controller 3 without the intermediary of an intermediate buffer (the memory 21 of the receiving controller 3), and therefore the response performance of the whole storage system 1 from the perspective of the host 5 can be improved.

Moreover, as per the storage system 1, in a storage system in which a cluster is configured from a plurality of storage controllers 3 and the host 5 is made to view the cluster as one storage apparatus, conventionally, in order to facilitate control, the memory area of the memory 21, which is used as an intermediate buffer as described earlier with reference to step S7 in FIG. 6B, is managed partitioned so as to be mapped to each of the storage controllers 3 and the partitioned memory areas are fixedly allocated to each of the storage controllers. Therefore, in a storage system comprising this cluster configuration, due to the capacity of the memory 21, the number of storage controllers 3 which the storage system comprises is limited and there has been a problem in that the usage efficiency of the memory area which has been allocated to storage controllers 3 with limited access is poor and the memory area of the memory 21 cannot be effectively used.

Where this issue is concerned, in the storage system 1, because the write data from the host 5 is DMA-transferred directly to the switch interface 24 of the owner controller 3, the memory area of the memory 21 need not be allocated fixedly to each storage controller 3 and consequently the number of storage controllers 3 which the storage system 1 comprises is not limited, and hence it is also possible to obtain an effect whereby the memory area of the memory 21 can be used effectively.

(5) Other Embodiments

Note that although a case was described in the foregoing embodiment in which the present invention was applied to the storage system 1 which was configured from four storage controllers 3 as per FIG. 1, the present invention is not limited to or by such an application, rather, the present invention can also be widely applied to storage systems which are configured from two, three or four storage controllers 3.

Moreover, although a case was described in the foregoing embodiment in which various system functions such as 'single write,' 'double write' and 'read' can be activated by the protocol chip 34 of the front-end 22 storing a PCI packet in the data buffer RAM 43 of the switch interface 24, the present invention is not limited to or by such an application, rather, required system functions can be activated as described earlier by means of a component part which comprises the DMA function of the front-end 22 other than the protocol chip 34 and a device which comprises a DMA function other than the front-end 22, and so forth.

Furthermore, although a case was described in the foregoing embodiment in which the owner MP 20A stores the switch interface parameter 37 in a parameter storage area 42A which has been allocated to its own MP in the parameter storage register 42 and the protocol chip 34 stores commands and write data and so forth for the owner MP 20A in the corresponding data storage area 43A of the data buffer RAM 43, the present invention is not limited to or by such an application, rather, a partial area of the memory 21 could also be used in place of the parameter storage register 42 and data buffer RAM 43. In short, as long as it is possible to manage the mapping relationships between the memory areas (parameter storage areas) of each MP 20A in which the owner MP 20A stores the switch interface parameter 37 and the memory areas (data storage areas) in which the protocol chip 34 stores the commands and write data for the owner MP 20A, the memory areas other than the parameter storage register 42 and data buffer RAM 43 may be provided in a location other than the switch interface 24.

Moreover, although a case was described in the foregoing embodiment in which, in the switch interface 24, the execution of system functions is performed by using only the destination address of the PCI packet which was stored in the header HD of the PCI packet supplied from the protocol chip 34 of the front-end 22, the present invention is not limited to or by such an application, rather, a system function which is to be executed by the switch interface 24 could be designated by also using information on the TLP type (type of command supplied from the host 5 such as read, write, and so forth) which is stored in the header HD of the PCI packet, and a requester ID (ID of the transmission source device of the PCI packet).

For example, it is possible to execute control such as verifying the accuracy of the write data by using a certification code that has been added to the write data when the requester ID is the ID of a certain protocol chip 34 and not verifying the accuracy of the write data when the requester ID is another ID. As a result of the foregoing, the header HD of the PCI packet can be utilized as a command and the content of a system function which is activated in the switch interface 24 can be designated in more detail.

Furthermore, although a case was described in the foregoing embodiment in which, each time a command is supplied from the host 5, the owner MP 20A generates a corresponding switch interface parameter 37 and stores same in the corresponding parameter storage area 42A of the parameter storage register 42 of the switch interface 24, the present invention is not limited to or by such an application, rather, a fixed switch interface parameter 37 could also be stored fixedly in some or all of the parameter storage areas 42A. As a result of the foregoing, in cases such as when the same command is being issued repeatedly from the host 5, the response performance of the storage system 1 from the perspective of the host 5 can be improved.

Furthermore, although a case was described in the foregoing embodiment in which one parameter storage area 42A of the parameter storage register 42 is fixedly allocated to one MP 20A, the present invention is not limited to or by such an application, rather, a plurality of parameter storage areas 42A of the parameter storage register 42 could also be dynamically allocated to the MP 20A.

Furthermore, although a case was described in the foregoing embodiment in which the protocol chip 34 of the front-end 22 activates a system function by means of a PCI packet, the present invention is not limited to or by such an application, rather, the protocol chip 34 of the front-end 22 could also be configured to activate a system function by means of a data packet according to a standard other than PCI.

The present invention can be widely applied to storage systems of a variety of configurations which are configured from a plurality of storage controllers and storage apparatuses.

REFERENCE SIGNS LIST

1 . . . storage system, 3, 3A to 3D . . . storage controllers 5, 5A to 5D . . . host, 6 . . . memory device, 7, 7A to 7D . . . memory apparatus, 20 . . . CPU, 20A . . . MP, 21 . . . memory, 22 . . . front-end, 24 . . . switch interface, 34 . . . protocol chip, 37 . . . switch interface parameter, 38 . . . protocol chip parameter, 42 . . . parameter storage register, 42A . . . parameter storage area, 43 . . . data buffer RAM, 43A . . . data storage area, 44 . . . header/parameter reading unit, 45 . . . parameter decoding unit, 46 . . . function implementation unit, 47 . . . DMA unit, HD . . . header.

The invention claimed is:

1. A storage system having a plurality of storage controllers which are bidirectionally communicably coupled and providing logical volumes defined in a memory area provided by one or more memory devices coupled to each of the storage controllers to a host as memory areas for reading and writing data, each of the plurality of storage controllers comprising:

a front-end unit which sends and receives commands and data to and from the host;

an interface unit which functions as an interface during communications with a different storage controller from the plurality of storage controllers in the system;

a processor which processes the command from the host; and a parameter storage area and a data storage area, the parameter storage area is provided inside or outside the interface unit and the data storage area is provided inside or outside the interface unit, wherein the parameter storage area is subdivided into a plurality of first areas, and the data storage area is subdivided into a plurality of second areas, the plurality of second areas are each mapped to each of the plurality of first areas, the front-end unit of a receiving storage controller, which is one of the plurality of storage controllers, receives a write command from the host and transfers the write command to a owner storage controller, which is one of the plurality of storage controllers, corresponding to a logical volume to which is a write command destination, the processor of the owner storage controller stores a parameter, which includes an address of the write command destination in the owner storage controller and an address of a write destination in a pair storage controller, which is one of the plurality of storage controllers, corresponding to the owner storage controller, in one of the plurality of first areas in the parameter storage area and issues a notification to the front-end unit of the receiving storage controller regarding an address of one of the plurality of second areas which is mapped to the one of the plurality of first areas which is storing the parameter, the front-end unit of the receiving storage controller generates a data packet based on write data received from the host and configures a write destination address of data in the data packet as the address of the one of the plurality of second areas that was issued in the notification and stores the generated data packet at the address of the data storage area, the front-end unit specifies the one of the plurality of second areas where the data packet is stored based on the write destination address which is stored in a header of the data packet, the interface unit of the owner storage controller reads the parameter stored in the one of the plurality of first areas which is mapped to the destination of the address stored in the header of the data packet which has been stored in the data storage area, and the interface unit transfers the write data stored in the data storage area to the address of the write command destination in the owner storage controller and the address of the write destination in the pair storage controller based on the read parameter, thereby performing double write without a processor of the receiving storage controller.

2. The storage system according to claim 1, wherein a plurality of processors are provided in the storage controller, the parameter storage area is subdivided into the plurality of the first areas so as to be mapped to each of the plurality of processors, and each of the plurality of processors stores the parameter in the self-allocated first area in the parameter storage area.

3. The storage system according to claim 1, wherein a notification of completion of the double write which is executed according to system function issued to the processor where the parameter is stored in the one of the plurality of first areas, and the processor awaits the notification of completion and releases the one of the plurality of first areas of the parameter storage area.

4. The storage system according to claim 1, wherein the interface unit in each of the plurality of storage controllers is connected to an other interface unit in a different one of the plurality of storage controllers via a PCIe switch.

5. The storage system according to claim 4, wherein the front-end unit of each of the plurality of storage controllers performs DMA-transfer of the write data to the data storage area of an other one of the plurality of storage controllers.

6. The storage system according to claim 4, wherein the interface unit of each of the plurality of storage controllers performs DMA-transfer of the write data to the data storage area of an other one of the plurality of storage controllers.

* * * * *